US008071694B2

(12) United States Patent
Yu et al.

(10) Patent No.: US 8,071,694 B2
(45) Date of Patent: Dec. 6, 2011

(54) THERMOPLASTIC POLYCARBONATE/POLYESTER BLEND COMPOSITIONS WITH IMPROVED MECHANICAL PROPERTIES

(75) Inventors: Ren Yu, Shanghai (CN); Jing Zhang, Beijing (CN); Zhaohui Qu, Shanghai (CN); Tong Sun, Shanghai (CN); Wayne Yao, Shanghai (CN)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/034,376

(22) Filed: Feb. 20, 2008

(65) Prior Publication Data
US 2009/0209695 A1 Aug. 20, 2009

(51) Int. Cl.
C08L 69/00 (2006.01)
(52) U.S. Cl. ........ 525/439; 525/437; 525/433; 525/436; 524/451; 524/537
(58) Field of Classification Search .................. 524/451, 524/537; 525/433, 436, 437, 439
See application file for complete search history.

(56) References Cited

U.S. PATENT DOCUMENTS

| 4,154,775 | A | 5/1979 | Axelrod |
| 4,746,701 | A | 5/1988 | Kress et al. |
| 5,179,137 | A | 1/1993 | Okamoto et al. |
| 5,348,557 | A | 9/1994 | von der Eltz et al. |
| 5,403,361 | A | 4/1995 | Schrell et al. |
| 5,512,061 | A | 4/1996 | von der Eltz et al. |
| 5,676,660 | A | 10/1997 | Mukaida et al. |
| 5,709,933 | A | 1/1998 | Evans |
| 5,847,011 | A | 12/1998 | Terado et al. |
| 5,855,624 | A | 1/1999 | Fujitani et al. |
| 6,136,215 | A | 10/2000 | Evans et al. |
| 6,210,792 | B1 | 4/2001 | Seethamraju et al. |
| 6,352,610 | B1 | 3/2002 | Schmidt et al. |
| 6,361,871 | B1 | 3/2002 | Jenkner et al. |
| 6,544,296 | B2 | 4/2003 | Gardner et al. |
| 6,656,487 | B2 | 12/2003 | Afriate et al. |
| 6,676,745 | B2 | 1/2004 | Merkley et al. |
| 6,767,553 | B2 | 7/2004 | Sun et al. |
| 6,830,784 | B2 | 12/2004 | Gutowski et al. |
| 6,870,025 | B2 | 3/2005 | McCloskey et al. |
| 6,939,903 | B2 | 9/2005 | Sigworth et al. |
| 6,949,289 | B1 | 9/2005 | Lawton et al. |
| 7,060,155 | B2 | 6/2006 | Dong et al. |
| 7,118,617 | B2 | 10/2006 | Asano et al. |
| 7,175,883 | B2 | 2/2007 | Hommmes et al. |
| 7,265,166 | B2 | 9/2007 | Gebhard et al. |
| 2002/0018860 | A1 | 2/2002 | Filippou et al. |
| 2002/0059886 | A1 | 5/2002 | Merkley et al. |
| 2002/0142014 | A1 | 10/2002 | Afriat et al. |
| 2003/0166779 | A1* | 9/2003 | Khemani et al. ............... 525/178 |
| 2003/0180551 | A1 | 9/2003 | Lin |
| 2003/0196960 | A1 | 10/2003 | Hughes |
| 2004/0048032 | A1 | 3/2004 | Ankele |
| 2004/0072924 | A1 | 4/2004 | Sigsworth et al. |
| 2004/0145078 | A1 | 7/2004 | Merkley et al. |
| 2004/0146660 | A1 | 7/2004 | Goodwin et al. |
| 2005/0137359 | A1* | 6/2005 | Agarwal et al. ................ 525/437 |
| 2005/0154114 | A1* | 7/2005 | Hale .............................. 524/436 |
| 2006/0009549 | A1 | 1/2006 | Legters et al. |
| 2006/0134337 | A1 | 6/2006 | Glassel et al. |
| 2006/0147695 | A1 | 7/2006 | Serizawa et al. |
| 2006/0276582 | A1* | 12/2006 | Mochizuki et al. ............ 524/537 |
| 2007/0197740 | A1* | 8/2007 | Hayata et al. .................. 525/439 |
| 2007/0203287 | A1 | 8/2007 | Tanaka et al. |
| 2008/0033097 | A1* | 2/2008 | Hayata et al. .................. 524/496 |
| 2008/0188597 | A1* | 8/2008 | Moriyama et al. ............ 524/127 |
| 2009/0067794 | A1* | 3/2009 | Aoyagi et al. ................. 385/128 |
| 2009/0105378 | A1* | 4/2009 | Mukawa et al. ................ 524/95 |

FOREIGN PATENT DOCUMENTS

| IN | 181233 A1 | | 5/1998 |
| JP | 1040677 A | | 2/1989 |
| JP | 4108185 A | | 4/1992 |
| JP | 2006111858 A2 | | 4/2006 |
| WO | WO 2006/038506 | * | 4/2006 |
| WO | WO 2006/077721 | * | 7/2006 |

OTHER PUBLICATIONS

Pang et al. J. App. Poly. Sci. vol. 107, 2854-2860. Nov. 2007.*
Cruz et al. Journal of Applied Polymer Science. vol. 24, pp. 2101-2112 (1979).*
How to improve the strength of polymer composites using natural plant fibers. Effect of surface treatment, fiber length etc. on the observed strength of FRTP. Fujii, Toru; Tanaka, Tatsuya; Fujiura, Takayasu. Dep. Mech. Eng., Doshisha University, Kyoto, Japan. Science and Engineering Review of Doshisha University (2007), 47(4, Suppl.), 79-84. Publisher: Doshisha University, Science and Engineering Research Institute.
Determination of optimal alkaline treatment conditions for fique fiber bundles as reinforcement of composite materials. Castro, Cristina; Palencia, Ana; Gutierrez, Ivan; Vargas, Gustavo; Ganan, Piedad. Facultad de Ingenieria Quimica, Universidad Pontificia Bolivariana, Medellin, Colombia. Revista Tecnica de la Facultad de Ingenieria, Universidad del Zulia (2007), 30(2), 136-142. Publisher: Universidad del Zulia, Facultad de Ingenieria.

(Continued)

Primary Examiner — Mark Eashoo
Assistant Examiner — Michael Salvitti
(74) Attorney, Agent, or Firm — Cantor Colburn LLP

(57) ABSTRACT

Disclosed is a thermoplastic composition comprising a mixture of from 10 to 98 weight % of a polycarbonate polymer, from 2 to 90 weight % of a polyester polymer comprising structures derived from a diol compound having the structure (A) HO—Z—OH, wherein Z is a $C_1$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH, from 0 to 5 weight % of a polylactic acid polymer, wherein the sum of the polycarbonate polymer, the polyester polymer, and the polylactic acid polymer is equal to 100 weight %. The thermoplastic composition has improved mechanical properties.

19 Claims, No Drawings

OTHER PUBLICATIONS

Fiber-matrix adhesion in natural fiber composites. Herrera Franco, Pedro J.; Valadez-Gonzalez, Alex. Unidad de materiales, Centro de Investigacion Cientifica de Yucatan, Merida, Yucatan, Mex. Editor(s): Mohanty, Amar K.; Misra, Manjusri; Drzal, Lawrence T. Natural Fibers, Biopolymers, and Biocomposites (2005), 177-230. Publisher: CRC Press LLC, Boca Raton, Fla.

Surface modifications of natural fibers and performance of the resulting biocomposites: An overview. Mohanty, A. K.; Misra, M.; Drzal, L. T. Composite Materials and Structures Center, Michigan State University, East Lansing, MI, USA. Composite Interfaces (2001), 8(5), 313-343. Publisher: VSP BV.

Chemical Coupling in Wood Fiber and Polymer Composites: a Review of Coupling Agents and Treatments. Lu, John Z.; Wu, Qinglin; McNabb, Jr., Harold S. Society of Wood Science and Technology State-of-Art Review. Wood and Fiber Science, Jan. 2000, V. 32(1), 88-104.

Development and evaluation of mechanical properties for Kenaf fibers/PLA composites. Ben, Goichi; Kihara, Yuichi. Nihon University, Izumicho, Narashino, Chiba, Japan. Key Engineering Materials (2007), 334-335(Pt. 1, Advances in Composite Materials and Structures), 489-492. Publisher: Trans Tech Publications Ltd.

Interfacial adhesion in bamboo fiber/biodegradable polymer composites. Nakamura, M.; Sahoo, S.; Ishiaku, U. S.; Kotaki, M.; Nakai, A.; Hamada, H.; Kitagawa, K. Department of Advanced Fiber-Science, Kyoto Institute of Technology, Matsugasaki, Sakyo-ku, Kyoto, Japan. Editor(s): Lo, J. Design, Manufacturing and Applications of Composites, Proceedings of the Joint Canada-Japan Workshop on Composites, 6th, Toronto, ON, Canada, Aug. 24-26, 2006, 52-58. Publisher: DEStech Publications, Inc., Lancaster, PA.

Evaluation of interfacial properties of sisal fiber reinforced high density polyethylene (HDPE) composites. Li, Yan; Deng, Hongxia; Yu, Yehong. School of Aerospace Engineering and Applied Mechanics, Tongji University, Shanghai, Peop. Rep. China. Key Engineering Materials (2007), 334-335(Pt. 1, Advances in Composite Materials and Structures), 625-628. Publisher: Trans Tech Publications Ltd.

Poly(butylene succinate) Composites Reinforced with Short Sisal Fibres. Shibata, Mitsuhiro; Makino, Retsu; Yosomiya, Ryutoku; Takeishi Hiroyuku, Chiba Institute of Technology. Received: Dec. 12, 2000; Accepted Jan. 31, 2001, 1-6.

The effect of silane coupling agents on the viscoelastic properties of rubber biocomposites. Jacob, Maya; Francis, Bejoy; Varughese, K. T.; Thomas, Sabu. School of Chemical Sciences, Mahatma Gandhi University, Kottayam, India. Macromolecular Materials and Engineering (2006), 291(9), 1119-1126. Publisher: Wiley-VCH Verlag GmbH & Co. KGaA.

Effect of coupling agents on the moisture absorption of natural fiber-reinforced plastics. Bledzki, A. K.; Gassan, J. Institut Werkstofftechnik-Kunststoff-und Recyclingtechnik, Kassel, Germany. Angewandte Makromolekulare Chemie (1996), 236 129-38. Publisher: Huethig & Wepf.

Pre-treatment of flax fibers for use in rotationally molded biocomposites. Wang, B.; Panigrahi, S.; Tabil, L.; Crerar, W. Department of Agricultural and Bioresource Engineering, University of Saskatchewan, Saskatoon, SK, Can. Journal of Reinforced Plastics and Composites (2007), 26(5), 447-463. Publisher: Sage Publications Ltd.

Influences of various surface pretreatments on the mechanical and degradable properties of photografted oil palm fibers. Rahman, M. Mizanur; Mallik, Abul K.; Khan, Mubarak A. Department of Applied Chemistry and Chemical Technology, University of Dhaka, Dhaka, Bangladesh. Journal of Applied Polymer Science (2007), 105(5), 3077-3086. Publisher: John Wiley & Sons, Inc.

Effect of chemical treatments of Alfa (*Stipa tenacissima*) fibres on water-sorption properties. Bessadok, A.; Marais, S.; Gouanve, F.; Colasse, L.; Zimmerlin, I.; Roudesli, S.; Metayer, M. Laboratoire "Polymeres, Biopolymeres, Membranes", Universite de Rouen, Mon-Saint-Aignan, Fr. Composites Science and Technology (2007), 67(3-4), 685-697. Publisher: Elsevier B.V.

Surface treated cellulose fibers in flame retarded PP composites. Anna, P.; Zimonyi, E.; Marton, A.; Szep, A.; Matko, Sz.; Keszei, S.; Bertalan, Gy.; Marosi, Gy. Department of Organic Chemical Technology, Budapest University of Technology and Economics, Budapest, Hung. Macromolecular Symposia (2003), 202(Reactive Modification and Stability of Multicomponent Polymeric Systems), 245-254. Publisher: Wiley-VCH Verlag GmBH & Co. KGaA.

A Review on Interface Modification and Characterization of Natural Fiber Reinforced Plastic Composites. George, Jayamol; Sreekala, M.S.; Thomas, Sabu. Polymer Engineering and Science, Sep. 2001, vol. 41, No. 9, 1471-1485.

Biofiber-Reinforced Polypropylene Composites. Karnani, Rajeev; Krishnan, Mohan; Narayan, Ramani. Polymer Engineering and Science, Feb. 1997, vol. 37, No. 2, 476-483.

Effect of Cyclic Moisture Absorption Desorption on the Mechanical Properties of Silanized Jute-Epoxy Composites. Gassan, Jochen; Bledzki, Andrzej K. Polymer Composites, Aug. 1999, vol. 20, No. 4, 604-611.

Cellulosic fibre reinforced thermoplastic composites—a review. Mohanty, Smita; Nayak, Sanjay K.; Verma, Sushil K. Corporate Office: Central Institute of Plastics Engineering and Technology, Chennai, India. International Journal of Plastics Technology (2005), 9, 507-538. Publisher: Central Institute of Plastics Engineering & Technology.

* cited by examiner

8,071,694 B2

THERMOPLASTIC POLYCARBONATE/POLYESTER BLEND COMPOSITIONS WITH IMPROVED MECHANICAL PROPERTIES

BACKGROUND OF THE INVENTION

This invention is directed to thermoplastic compositions having improved mechanical properties such as notched Izod impact and comprising a polycarbonate polymer, a polyester polymer, and optionally a polylactic acid polymer.

Thermoplastics having good mechanical properties such as notched Izod impact strength are useful in the manufacture of articles and components for a wide range of applications, from automobile components, to decorative articles, to housings for electronic appliances, such as computers and cell phones. Due to environmental considerations and limitations in petrochemical resources and supplies, it is also desired that such thermoplastic compositions be based, at least in part, on potentially renewable raw materials such as natural polymers or "biosourced" polymers made, at least in part, from such renewable raw materials as succinic or lactic acids.

Publication JP2006-111858 discloses complex resin compositions based on polylactic acid said to have favorable impact strength, color, and flame retardance properties. The complex resin compositions require the use of a complicated mixture of numerous special components including a polylactic acid resin, a cellulose ester, an aromatic polycarbonate resin, a compatibilizer, a flame retardant, a fluorine-based compound, and an epoxy compound. In addition to the complexity concerning the number of required components in this composition, the document also specifically warns that great care must be taken in using very specific amounts of some of the components, and in many cases even their specific characteristics; otherwise problems such as poor processability, miscibility, thermal stability, and mechanical stability may result.

Publication JP2002-371172 discloses a polylactic acid resin composition said to have favorable stiffness, toughness, heat resistance, appearance and moldability. The disclosed resin composition comprises a polylactic acid and a polycarbonate, especially an aliphatic polyestercarbonate as a raw material, and it is disclosed that this composition is obtained by subjecting the polymers to a crosslinking reaction using a peroxide to compatibilize the polymers. In particular, the resin composition is obtained in a process of melting and mixing the polylactic acid, the polycarbonate and a radical reaction initiator under a nitrogen atmosphere. Specifically this document warns that this crosslinking process is complex, and one must take care in feeding and mixing these components so that undesired decomposition reactions or gel formation problems do not occur. In addition, it is disclosed that the selection of an appropriate initiator and the means of adding it are critical so that the initiator does not thermally decompose prior to bringing about the desired crosslinking.

U.S. Pat. No. 5,847,011 discloses the preparation of degradable copolymers comprising an aromatic polycarbonate block and an aliphatic polyester block by subjecting an aromatic polycarbonate and an aliphatic polyester to a reaction in the presence of a catalyst in a molten state or dissolved in an organic solvent. The degradable copolymers were stated to be distinctly different from the composition obtained by blending an aromatic polycarbonate and an aliphatic polyester. For example, they have both a single glass transition temperature and a single weight average molecular weight. In addition, the impact strength properties of such degradable copolymers are generally expected to be worse than those of a blend of the aromatic polycarbonate and an aliphatic polyester. Although the degradable copolymers have some desirable properties such as transparency and improved rates of biodegradability, nonetheless their preparation from an aromatic polycarbonate and an aliphatic polyester typically requires a reaction step of many hours at elevated temperatures and at reduced pressures under reflux conditions in a special reaction system, followed by a quenching reaction step with an acid, and finally a drying step to remove the various solvents and reaction byproducts.

There accordingly remains a need in the art for thermoplastic compositions based on raw materials obtainable from renewable and/or plant sources such as polyesters of succinic acid. These thermoplastic compositions should have improved mechanical properties and should not require complex mixtures of components. Another desirable feature is ease of manufacture, such as not requiring extensive reaction and purification steps. It will be shown that the mechanical properties of the thermoplastic compositions of this invention are desirably comparable to those of other thermoplastic polyester/polycarbonate blend compositions. Furthermore it will be shown that the compositions of this invention can be readily made through the use of simple blending processes known in the art and that even relatively simple mixtures of the specified components have desirable properties. In addition, polylactic acid, which is a biosourced polymer, may optionally be incorporated in the thermoplastic compositions of this invention at low levels.

SUMMARY OF THE INVENTION

In one embodiment, a thermoplastic composition comprises a mixture of from 10 to 98 weight % of a polycarbonate polymer, from 2 to 90 weight % of a polyester polymer comprising structures derived from a diol compound having the structure (A) HO—Z—OH, wherein Z is a $C_1$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH, and from 0 to 5 weight % of a polylactic acid polymer, wherein the sum of the polycarbonate polymer, the polyester polymer, and the polylactic acid polymer is equal to 100 weight %. In some embodiments, Z is a $C_2$ to $C_6$ linear aliphatic radical, a $C_3$ to $C_6$ branched or cyclo-aliphatic radical, or a combination thereof, and in one specific embodiment the polyester polymer is polybutylene succinate.

In another embodiment, the thermoplastic composition comprises a mixture of from 10 to 98 weight % of a polycarbonate polymer, from 2 to 90 weight % of a polyester polymer comprising structures derived from a diol compound having the structure (A) HO—Z—OH, wherein Z is a $C_1$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH, from 0 to 5 weight % of a polylactic acid polymer, and from 0 to 30 weight % of a filler, wherein the sum of the polycarbonate polymer, the polyester polymer, the polylactic acid polymer, and the filler is equal to 100 weight %. In some embodiments, Z is a $C_2$ to $C_6$ linear aliphatic radical, a $C_3$ to $C_6$ branched or cyclo-aliphatic radical, or a combination thereof, and in one specific embodiment the polyester polymer is polybutylene succinate.

In yet another embodiment, the thermoplastic composition comprises a mixture of from 10 to 98 weight % of a polycarbonate polymer, from 2 to 90 weight % of a polyester polymer comprising structures derived from a diol compound having the structure (A) HO—Z—OH, wherein Z is a $C_1$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH, from 0 to 5 weight % of a polylactic acid polymer, from 0 to 30 weight % of a filler, and from 0 to 30 weight % of an impact modifier, wherein the sum of the polycarbonate polymer, the polyester polymer, the polylactic acid polymer, the filler, and the impact modifier is equal to 100 weight %. In some embodiments, Z is a $C_2$ to $C_6$ linear aliphatic radical, a $C_3$ to $C_6$ branched or cyclo-aliphatic radical, or a combination thereof, and in one specific embodiment the polyester polymer is polybutylene succinate.

In still another embodiment, the thermoplastic composition consists essentially of a mixture of from 10 to 98 weight % of a polycarbonate polymer, from 2 to 90 weight % of a polyester polymer comprising structures derived from a diol compound having the structure (A) HO—Z—OH, wherein Z is a $C_1$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH, from 0 to 30 weight % of a filler, from 0 to 30 weight % of an impact modifier, and from 0 to 20 weight % of an additive, wherein the additive is a quencher, a flow promoter, an antioxidant, a heat stabilizer, an anti-hydrolysis stabilizer, a light stabilizer, an UV absorber, a plasticizer, a lubricant, a mold release agent, an anti-static agent, a pigment, a dye, a flame retardant, an anti-drip agent, a blowing agent, or a combination of two or more of the foregoing additives, and wherein the sum of the polycarbonate polymer, the polyester polymer, the filler, the impact modifier, and the additive is equal to 100 weight %.

In another embodiment, an article comprises the above thermoplastic composition.

In still another embodiment, a method of manufacture of an article comprises molding, extruding, or shaping the above thermoplastic composition.

DETAILED DESCRIPTION OF THE INVENTION

In one embodiment, the thermoplastic composition comprises a mixture of from 10 to 98 weight % of a polycarbonate polymer, from 2 to 90 weight % of a polyester polymer comprising structures derived from a diol compound having the structure (A) HO—Z—OH, wherein Z is a $C_1$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH, and from 0 to 5 weight % of a polylactic acid polymer, wherein the sum of the polycarbonate polymer, the polyester polymer, and the polylactic acid polymer is equal to 100 weight %.

Numerical values in the specification and claims of this application, particularly as they relate to copolymer compositions, reflect average values for a composition that may contain individual copolymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value. The modifier "about" used in connection with a quantity is inclusive of the stated value and has the meaning dictated by the context (e.g., includes the degree of error associated with measurement of the particular quantity). The terms "optional" or "optionally" mean that the subsequently described event or circumstance may or may not occur, or that the subsequently identified material may or may not be present, and that the description includes instances where the event or circumstance occurs or where the material is present, and instances where the event or circumstance does not occur or the material is not present.

Compounds are described herein using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through the carbon of the carbonyl (C=O) group. The singular forms "a," "an," and "the" include plural referents unless the context clearly dictates otherwise. For example, "a dihydroxy compound" refers to either a single species of compound or a mixture of such species unless the context indicates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another.

The thermoplastic composition comprises a polycarbonate polymer. As used herein, the term "polycarbonate polymer" refers to a polymer comprising the same or different carbonate units, or a copolymer that comprises the same or different carbonate units, as well as one or more units other than carbonate (i.e. copolycarbonate). A "linear polycarbonate polymer" means that the polycarbonate polymer contains less than 0.05 weight % of incorporated residues of branching agents based on 100 parts by weight of the polycarbonate polymer. The thermoplastic composition also comprises a polyester polymer. The term "polyester polymer" refers to a polymer comprising the same or different ester units, or a copolymer that comprises the same or different ester units. "PHBV" means the poly(3-hydroxybutyrate-co-3-hydroxyvalerate) polymer, "PLA" means the polylactic acid polymer, and "PBS" means the polybutylene succinate polymer. The term "aliphatic" refers to a hydrocarbon radical having a valence of at least one comprising a linear or branched array of carbon atoms which is not cyclic; "aromatic" refers to a radical having a valence of at least one comprising at least one aromatic group; "cycloaliphatic" refers to a radical having a valence of at least one comprising an array of carbon atoms which is cyclic but not aromatic; "alkyl" refers to a straight or branched chain monovalent hydrocarbon radical; "alkylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloalkylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene rings; "aromatic radical" refers to a radical having a valence of at least one comprising at least one aromatic group; examples of aromatic radicals include phenyl, pyridyl, furanyl, thienyl, naphthyl, and the like; "arylene" refers to a benzene ring diradical or to a benzene ring system diradical fused to at least one optionally substituted benzene ring; "alkylaryl" refers to an alkyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; and "direct bond", where part of a structural variable specification, refers to the direct joining of the substituents preceding and succeeding the variable taken as a "direct bond".

As used herein, the terms "polycarbonate polymer" and "polycarbonate resin" mean compositions having repeating structural carbonate units of the formula (1):

(1)

in which the $R^1$ groups are aromatic, aliphatic, or alicyclic organic radicals. In one embodiment, at least 60 percent of the total number of $R^1$ groups are aromatic organic radicals and the balance thereof are aliphatic, alicyclic, or aromatic radicals. In another embodiment, each $R^1$ is an aromatic organic radical, for example a radical of the formula (2):

$$-A^1-Y^1-A^2 \quad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene. In one specific embodiment, the polycarbonate polymer is a linear homopolymer derived from bisphenol A, in which each of $A^1$ and $A^2$ is p-phenylene and $Y^1$ is isopropylidene.

Polycarbonate polymers may be produced by the reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of formula (3)

$$HO-A^1-Y^1-A^2-OH \quad (3)$$

wherein $Y^1$, $A^1$ and $A^2$ are as described above. Also included are bisphenol compounds of general formula (4):

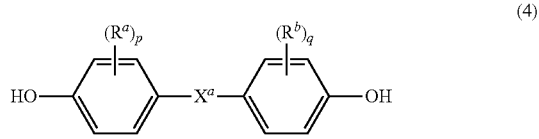
(4)

wherein $R^a$ and $R^b$ each represent a halogen atom or a monovalent hydrocarbon group and may be the same or different; p and q are each independently integers of 0 to 4; and $X^a$ represents one of the groups of formula (5):

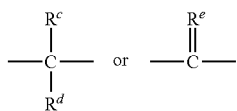
(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used. The polycarbonate copolymers may be made by methods known in the art, such as by the method described in U.S. Application Publication 2003/0149223.

In some embodiments, blends of at least two different polycarbonate polymers are used. In some of these embodiments, blends of at least two polycarbonate polymers having different molecular weights are used. Branched polycarbonate polymers are also useful, as well as blends of a linear polycarbonate polymer and a branched polycarbonate polymer. The branched polycarbonate polymers may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents may be added at a level of 0.05 weight % to 2.0 weight % based on 100 parts by weight of the polycarbonate polymer. All types of polycarbonate polymer end groups are contemplated as being useful in the polycarbonate polymer composition, provided that such end groups do not significantly affect desired properties of the thermoplastic compositions.

"Polycarbonate polymers" and "polycarbonate resins" as used herein further includes blends of polycarbonate polymers with other copolymers comprising carbonate chain units. A specific suitable copolymer is a "polyester carbonate", also known as a copolyester-polycarbonate. Such "polyester carbonate" copolymers further contain, in addition to recurring carbonate chain units of the formula (1), repeating units of formula (6)

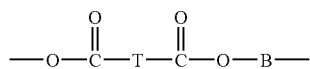

(6)

wherein B is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical. As used herein, polyester carbonate means compositions having at least 5 mole percent of carbonate linkages relative to the molar sum of the carbonate and ester linkages.

In one embodiment, B is a $C_{2-6}$ alkylene radical. In another embodiment, B is derived from an aromatic dihydroxy compound of formula (7):

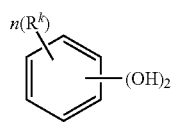

(7)

wherein each $R^k$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acid compounds that may be used to prepare the polyester carbonate include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 10:1 to 0.2:9.8. In another specific embodiment, B is a $C_{2-6}$ alkylene radical and T is p-phenylene, m-phenylene, naphthalene, a divalent cycloaliphatic radical, or a mixture thereof. This class of polyester carbonate includes the poly(alkylene terephthalates). Suitable aliphatic dicarboxylic acids include succinic acid, oxalic acid, malonic acid, glutaric acid, adipic acid, pimelic acid, suberic acid, azelaic acid, sebacic acid, undecanoic diacid, dodecanoic diacid, maleic acid and fumaric acid. Rather than utilizing the dicarboxylic acid per se, it is possible, and sometimes even preferred, to employ the reactive derivatives of the acid, such as the corresponding acid halides, in particular the acid dichlorides and the acid dibromides in the interfacial polymerization method or esters such as optionally substituted phenyl esters in the melt polymerization method. Thus, for example, instead of using isophthalic acid, terephthalic acid, or mixtures thereof, it is possible to employ isophthaloyl dichloride, terephthaloyl dichloride, and mixtures thereof.

Suitable polycarbonate polymers can be manufactured by processes such as interfacial polymerization or melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4$ PX, [CH$_3$(CH$_2$)$_5$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX, and CH$_3$[CH$_3$(CH$_2$)$_2$]$_3$NX, wherein X id Cl$^-$, Br$^-$, a C$_{1-8}$ alkoxy group or a C$_{6-18}$ aryloxy group. An effective amount of a phase transfer catalyst is from 0.1 to 10 weight % based on 100 parts by weight of bisphenol in the phosgenation mixture. In another embodiment an effective amount of phase transfer catalyst is from 0.5 to 2 weight % based on 100 parts by weight of bisphenol in the phosgenation mixture.

Alternatively, melt processes may be used to make the polycarbonate polymers. Generally, in the melt polymerization process, polycarbonate polymers may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

Blends and/or mixtures of more than one polycarbonate polymer may also be used. For example, a high flow and a low flow polycarbonate polymer may be blended together. In one embodiment, a blend and/or mixture of linear polycarbonate polymers having a weight average molecular weight relative to polycarbonate polymer standards of less than 31,000 Daltons, specifically between 18,000 and 31,000 Daltons, is used.

In some embodiments, the thermoplastic composition comprises from 10 to 98 weight %, specifically from 10 to 90 weight %, more specifically from 10 to 60 weight %, polycarbonate polymer based on 100 parts by weight of the thermoplastic composition.

The thermoplastic composition further comprises a polyester polymer comprising structures derived from a diol compound and a diacid compound, where the diol compound has the structure (A) HO—Z—OH, wherein Z is a C$_1$ to C$_{36}$ linear aliphatic radical, a C$_3$ to C$_{36}$ branched aliphatic or cycloaliphatic radical, a C$_6$ to C$_{36}$ aryl radical, or a C$_7$ to C$_{36}$ alkylaryl radical and the diacid compound has the structure (B) HOOC—CH$_2$CH$_2$—COOH (hereinafter also referred to as "the polyester polymer"). The diacid compound having structure (B) is known as succinic acid, and it may be obtained from biological sources, for example, from the fermentation of glucose or hydrolysates of biomass. In another embodiment, the polyester polymer comprises repeating structural units of formula (8):

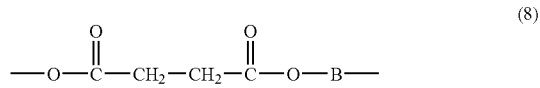

(8)

wherein B is as defined earlier in formula (6). In one embodiment, the polyester polymer comprises repeating units of formula (6):

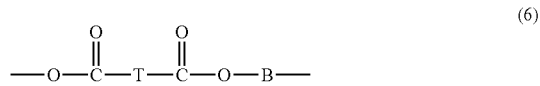

(6)

wherein at least 50% of the divalent radicals T are the radical —CH$_2$CH$_2$—. In another embodiment, the divalent radical B is —CH$_2$CH$_2$CH$_2$CH$_2$—.

The polyester polymer comprises structures derived from a variety of aliphatic and/or aromatic dihdroxy compounds having the structure (A) HO—Z—OH, wherein Z is a C$_1$ to C$_{36}$ linear aliphatic radical, a C$_3$ to C$_{36}$ branched aliphatic or cycloaliphatic radical, a C$_6$ to C$_{36}$ aryl radical, or a C$_7$ to C$_{36}$ alkylaryl radical. In one embodiment, Z is a C$_2$ to C$_6$ linear aliphatic radical, a C$_3$ to C$_6$ branched or cyclo-aliphatic radical, or a combination thereof In a specific embodiment, Z is a C$_4$ linear or branched aliphatic radical. Suitable dihydroxy compounds include those disclosed in the earlier section on the polycarbonate polymer such as aromatic dihydroxy compounds of formulas (A), (3) and (7) and bisphenol compounds of formula (4). Suitable aliphatic or cycloalkyl dihydroxy compounds also include for example, ethylene glycol, diethylene glycol, triethylene glycol, polyethylene glycol, propylene glycol, 1,3-propanediol, 2-methylpropanediol-1,3, dipropylene glycol, 1,3-butanediol, 1,4-butanediol, 3-methyl-1,5-pentanediol, 1,6-hexanediol, 1,9-nonanediol, 1,10-decanediol, 1,11-undecanediol, 1,12-dodecanediol, 1,13-tridecanediol, neopentyl glycol, polytetramethylene glycol, decamethylene glycol, 1,4-cyclohexanedimethanol, and C36 branched fatty diol (CAS #147853-32-5). In one embodiment, the aliphatic dihydroxy compound is 1,3-butanediol or 1,4-butanediol, and in a specific embodiment it is 1,4-butanediol. Suitable dihydroxy compounds also include alkyl oxide addition products of aromatic diols and bisphenols such as bisphenol A ethylene oxide addition product, bisphenol A propylene oxide addition product, or mixtures thereof. All of these various dihydroxy compounds can be used singly or as a mixture.

The polyester polymer may additionally comprise structures derived from a variety of aliphatic and/or aromatic dicarboxylic acid compounds in addition to the diacid compound having the structure (B) HOOC—CH$_2$CH$_2$—COOH. Suitable aliphatic dicarboxylic acids include succinic acid, oxalic acid, malonic acid, glutaric acid, adipic acid, pimelic acid, suberic acid, azelaic acid, sebacic acid, undecanoic diacid, dodecanoic diacid, maleic acid and fumaric acid. Suitable aromatic dicarboxylic acids include those disclosed earlier in the polyester carbonate copolymer section. All of these various dicarboxylic acid compounds can be used singly or as a mixture.

The polyester polymer may additionally comprise structures derived from a variety of polyester branching agents in order to modify the melt rheological properties of the polyester polymer. A polyester branching agent is defined as a molecule that has at least three functional groups that can participate in a polyester-forming reaction, such as hydroxyl, carboxylic acid, carboxylic ester, phosphorous-based ester (potentially trifunctional) and anhydride (difunctional). Suitable polyester branching agents include glycerol, pentaerythritol, trimellitic anhydride, pyromellitic dianhydride, and tartaric acid and derivatives of these compounds. The polyester branching agents may be used in amounts of from 0.05 to 2.0 weight % based on 100 parts by weight of the polyester polymer.

In another embodiment, the polyester polymer additionally comprises structures derived from hydroxycarboxylic acids. Suitable hydroxycarboxylic acids include, for example, glycolic acid, lactic acid, 2-hydroxybutanoic acid, 2-hydroxypentanoic acid, 2-hydroxyhexanoic acid, 2-hydroxyheptanoic acid, 2-hydroxyoctanoic acid, 2-hydroxy-2-methylpropanoic acid, 2-hydroxy-2-methylbutanoic acid, 2-hydroxy-2-ethylbutanoic acid, 2-hydroxy-2-methylpentanoic acid, 2-hydroxy-2-ethylpentanoic acid, 2-hydroxy-2-propylpentanoic acid, 2-hydroxy-2-butylpentanoic acid, 2-hydroxy-2-methylhexanoic acid, 2-hydroxy-2-ethylhexanoic acid, 2-hydroxy-2-propylhexanoic acid, 2-hydroxy-2-butylhexanoic acid, 2-hydroxy-2-pentylhexanoic acid, 2-hydroxy-2-methylheptanoic acid, 2-hydroxy-2-ethylheptanoic acid, 2-hydroxy-2-propylheptanoic acid, 2-hydroxy-2-butylheptanoic acid, 2-hydroxy-2-pentylheptanoic acid, 2-hydroxy-2-hexylheptanoic acid, 2-hydroxy-2-methyloctanoic acid, 2-hydroxy-2-ethyloctanoic acid, 2-hydroxy-2-propyloctanoic acid, 2-hydroxy-2-butyloctanoic acid, 2-hydroxy-2-pentyloctanoic acid, 2-hydroxy-2-hexyloctanoic acid, 2-hydroxy-2-heptyloctanoic acid, 3-hydroxypropanoic acid, 3-hydroxybutanoic acid, 3-hydroxypentanoic acid, 3-hydroxyhexanoic acid, 3-hydroxyheptanoic acid, 3-hydroxyoctanoic acid, 3-hydroxyvaleric acid, 3-hydroxy-3-methylbutanoic acid, 3-hydroxy-3-methylpentanoic acid, 3-hydroxy-3-methylheptanoic acid, 3-hydroxy-3-ethylpentanoic acid, 3-hydroxy-3-methylhexanoic acid, 3-hydroxy-3-ethylhexanoic acid, 3-hydroxy-3-propylhexanoic acid, 3-hydroxy-3-methylheptanoic acid, 3-hydroxy-3-ethylheptanoic acid, 3-hydroxy-3-propylheptanoic acid, 3-hydroxy-3-butylheptanoic acid, 3-hydroxy-3-methyloctanoic acid, 3-hydroxy-3-ethyloctanoic acid, 3-hydroxy-3-propyloctanoic acid, 3-hydroxy-3-butyloctanoic acid, 3-hydroxy-3-pentyloctanoic acid, 4-hydroxybutanoic acid, 4-hydroxypentanoic acid, 4-hydroxyhexanoic acid, 4-hydroxyheptanoic acid, 4-hydroxyoctanoic acid, 4-hydroxy-4-methylpentanoic acid, 4-hydroxy-4-methylhexanoic acid, 4-hydroxy-4-ethylhexanoic acid, 4-hydroxy-4-methylheptanoic acid, 4-hydroxy-4-ethylheptanoic acid, 4-hydroxy-4-propylheptanoic acid, 4-hydroxy-4-methyloctanoic acid, 4-hydroxy-4-ethyloctanoic acid, 4-hydroxy-4-propyloctanoic acid, 4-hydroxy-4-butyloctanoic acid, 5-hydroxypentanoic acid, 5-hydroxyhexanoic acid, 5-hydroxyheptanoic acid, 5-hydroxyoctanoic acid, 5-hydroxy-5-methylhexanoic acid, 5-hydroxy-5-methylheptanoic acid, 5-hydroxy-5-ethylheptanoic acid, 5-hydroxy-5-methyloctanoic acid, 5-hydroxy-5-ethyloctanoic acid, 5-hydroxy-5-propyloctanoic acid, 6-hydroxyhexanoic acid, 6-hydroxyheptanoic acid, 6-hydroxyoctanoic acid, 6-hydroxy-6-methylheptanoic acid, 6-hydroxy-6-methyloctanoic acid, 6-hydroxy-6-ethyloctanoic acid, 7-hydroxyheptanoic acid, 7-hydroxyoctanoic acid, 7-hydroxy-7-methyloctanoic acid, 8-hydroxyoctanoic acid, and other aliphatic hydroxycarboxylic acids. These acids can be used singly or as a mixture.

In one embodiment, the polyester polymer comprises less than 5 weight % of structures derived from lactic acid, 3-hydroxybutanoic acid or 3-hydroxyvaleric acid based on 100 parts by weight of the polyester polymer. Polymers comprising 5 weight % or more of lactic acid will be considered here to be polylactic acid polymers instead of polyester polymers. In another embodiment, the polyester polymer contains no structures derived from lactic acid, 3-hydroxybutanoic acid or 3-hydroxyvaleric acid.

Polymers containing 5 mole percent or more of carbonate linkages relative to the molar sum of the carbonate and ester linkages will be considered here to be polyester carbonates or copolyester-polycarbonates instead of polyester polymers. In some embodiments, the polyester polymer contains less than 4 mole percent, specifically less than 2 mole percent, of carbonate linkages relative to the molar sum of the carbonate and ester linkages. In one specific embodiment, the polyester polymer contains no carbonate linkages.

In yet another embodiment, the polyester polymer is an aliphatic polyalkylene succinate. In still another embodiment, the polyester polymer is selected from the group consisting of polyethylene succinate, polyethylene succinate-co-adipate, polyethylene succinate-co-terephthalate, polybutylene succinate, polybutylene succinate-co-adipate, and polybutylene succinate-co-terephthalate. In a specific embodiment, the polyester polymer is polybutylene succinate.

The polyester polymer can be prepared by methods known in the art, such as condensation polymerization between dicarboxylic acid compounds or their functional derivatives such as anhydrides and chlorides on the one hand and dihydroxy compounds on the other. The condensation polymerization may be carried out in solution, melt or in the solid phase or in a combinations of reaction steps in any of those phases. Generally, polyester polymers are produced by reaction of a dihydroxy compound with a dicarboxylic acid compound or a lower alkyl ester compound of a dicarboxylic acid, e.g., the dimethylester, and, if desired, further components. At first, the corresponding dicarboxylic acid diester is typically formed in an esterification or ester interchange reaction at temperatures from about 150° C. to about 300° C., which is then polycondensed at increasing temperature and reduced pressure, whereby the dihydroxy compound and water are split off. The final stages of the reaction are generally conducted under high vacuum (<10 mm of Hg) in order to produce a high molecular weight polyester polymer. Both reaction steps may make optional use of esterification and/or transesterification and/or polycondensation catalysts. Typical catalysts include compounds of Ti, Zr, Sn, Sb for the esterification, compounds of Mn, Co or Zn for the transesterification, and compounds of Sb, Ti, Pb, Ge, Zn or Sn for the polycondensation, whereby the compounds are in general oxides, alcoholates, acetates, or carboxylates. The amount of metal in the catalyst ranges mostly between 20 and 500 ppm, based on 100 parts by weight of the polyester polymer.

In one embodiment, the polyester polymer has a weight average molecular weight of at least 20,000 Daltons, optionally, 20,000 to 30,000 Daltons, optionally at least 22,000 Daltons, relative to polystyrene standards. In the case of some compositions, it may be advantageous to use a polycarbonate polymer having a lower melt viscosity (higher flow) so that there is not a mismatch in the melt viscosities of the polycarbonate polymer and the polyester polymer having the above molecular weight properties. Such a mismatch in viscosities results in a poorer mixing of the polymers and thus deterioration of the properties of the thermoplastic composition. Thus in one embodiment, the polycarbonate polymer will have an intrinsic viscosity of less than 58.5 dl/g.

In one embodiment, the thermoplastic composition comprises the polyester polymer in an amount that is from 2 to 90 weight %, specifically from 5 to 40 weight %, more specifically from 5 to 15 weight % based on 100 parts by weight of the thermoplastic composition.

In some embodiments, the thermoplastic composition includes one or more filler to increase the stiffness (e.g. modulus and tensile strength). In one embodiment, the thermoplastic composition comprises a mixture of from 10 to 98 weight % of a polycarbonate polymer, from 2 to 90 weight % of a polyester polymer comprising structures derived from a diol compound having the structure (A) HO—Z—OH, wherein Z is a $C_1$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH, from 0 to 5 weight % of a polylactic acid polymer, and from 0 to 30 weight % of a filler, wherein the sum of the polycarbonate polymer, the polyester polymer, the polylactic acid polymer, and the filler is equal to 100 weight %. Examples of suitable fillers or reinforcing agents include any materials known for these uses, provided that they do not adversely affect the desired properties. For example, suitable fillers and reinforcing agents include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as kenaf, cellulose, cotton, sisal, jute, flax, starch, cork flour, lignin, ramie, rattan, agave, bamboo, hemp, ground nut shells, corn, coconut (coir), rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents. In a specific embodiment, the filler is talc, glass fiber, kenaf fiber or a combination of two or more of the foregoing fillers. The fillers and reinforcing agents may be coated with a layer of metallic material to facilitate conductivity, or surface treated with silanes, siloxanes, or a combination of silanes and siloxanes to improve adhesion and dispersion with the polymeric matrix resin.

In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

In one embodiment, a thermoplastic composition comprises a polycarbonate polymer, the polyester polymer, and a filler, wherein the filler is talc, glass fiber, natural fiber or a combination of two or more of the foregoing fillers.

In some embodiments, the filler is a natural fiber that has been mechanically combed and/or biologically treated and/or chemically treated and/or decolorized prior to use. Such treatments may be used, for example, in order to improve the dispersability, adhesion, and uniformity of the fibers and to increase their aspect ratio or remove extractable impurities or to modify their surface properties. For example, alkali treatment may be used to reduce the inter-fibrillar region of the natural fiber by removing hemicellulose and lignin, which reduce the adhesive force between fibrils to allow a more homogenous dispersion of the natural fiber in the thermoplastic composition matrix, as well as increase the aspect ratio of the fiber in the thermoplastic composition. In addition, the alkali treatment may also be used to improve the chemical interaction between the natural fiber and polymer matrix of the thermoplastic composition. To reduce the hydrophilic nature of the fibers, acetylation treatments may be used. Mercerization, acetylation, and resorcinol/hexamethylenetetramine treatments may be applied to the natural fibers in order to improve their adhesion. Additionally, alkali solution treatment may increase the concentration of hydroxyl groups on the surface of the natural fiber to give a better interaction between the fibers and the matrix. Steam treatment may be used to extract lignin from the natural fiber. Extractable impurities are compounds that are soluble in organic solvents or water and usually present in rather small amounts, and they include waxes, fats and resins. In some embodiments, the filler is a natural fiber that has an aspect ratio of between 4 and 80, specifically between 10 and 50. In some specific embodiments, the filler is a natural fiber that has been cut and/or chopped and/or ground to an aspect ratio of between 4 and 80, specifically between 10 and 50.

The filler may be a fiber that is coated with a silane, siloxane or their combination in a dipping or spraying process. In some specific embodiments, the coating composition is a solution or mixture in water or an organic solvent. In some specific embodiments, the coating composition comprises epoxy functional silanes, aminoalkyl siloxanes, polymethylhydrogensiloxane, γ-glycidoxypropyltrimethoxysilane, or γ-methacryloxypropyltrimethoxysilane. Examples of suitable silanes and siloxanes may include SILQUEST® A-187 silane or SILQUEST® A-174 or TSF-484 siloxanes, obtainable from Momentive Performance Materials. In some embodiments, the filler is a natural fiber that has been coated with a composition comprising a silane or siloxane oligomer, prepolymer or polymer or their combinations. In some embodiments, the silane or siloxane oligomer, prepolymer or polymer is a copolymer. In some specific embodiments, the silane or siloxane oligomer, prepolymer or polymer has a random, block, gradient, or alternating copolymer structure. In some specific embodiments, the natural fiber has been coated with 0.5 to 5 weight %, specifically 1 to 2 weight %, of a silane or a siloxane or their combination based on 100 parts by weight of the natural fiber. In another specific embodiment, the filler is a natural fiber that has been mechanically combed, and biologically and/or chemically treated and/or decolorized prior to the coating process. In yet another specific embodiment, the natural fiber is kenaf fiber that has been spray-coated.

In some embodiments, the filler is a natural fiber that has been coated in a coating process comprising the steps of: (a)

spraying the natural fiber with a liquid form of a coating composition comprising the structural unit of formula (9A), (9B) or their combination:

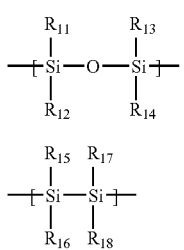

(9A)

(9B)

wherein $R_{11}$ to $R_{18}$ are selected from the group consisting of H, OH, alkoxy, phenoxy, aryloxy, and arylalkoxy, and (b) reacting the coating composition to release hydrogen, water or alcohol and form a coated natural fiber.

In some embodiments, the thermoplastic compositions further comprise up to 50 weight %, specifically from 0 to 30 weight %, more specifically from 1 to 30 weight %, most specifically from 5 to 15 weight %, of fillers based on 100 parts by weight of the mixture of the thermoplastic composition.

In some embodiments, the thermoplastic composition may include other optional polymers such as polyamides, polyesters, polyurethanes, polysiloxanes, polyimides, phenolics, epoxies, ionomers, liquid crystal polymers, polyarylates, polyketones, celluloses, polysulfides, polyacetals, polyanhydrides, polyolefins, fluoropolymers, rubbers, vinyl polymers, and inorganic polymers, provided that they do not adversely affect the desired properties. These optional polymers may also include polymers of natural origin, such as, e.g., starch, cellulose, chitosan alginates or natural rubbers. Starches and celluloses may be modified and among them there may be mentioned, for instance, starch or cellulose esters with a substitution level within the range of 0.2 to 2.5, hydroxypropylated starches, and starches modified with fat chains. Starch may be used either destructurized, in a gel or in a filler form. These optional polymers may be homopolymers or copolymers of two or more monomers, and the monomers of the copolymers may be arranged in graft, alternating, periodic, random, statistical, or block structures. These optional polymers may be amorphous, crystalline, or semicrystalline or elastomers in nature.

In one embodiment, a poly(alkylene terephthalate) is used as an optional polymer in the thermoplastic composition. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing optional polyester polymers. Also contemplated are the above optional polyester polymers with a minor amount, e.g., from about 0.5 to about 10 percent by weight, of units derived from an aliphatic diacid and/or an aliphatic polyol to make copolyesters.

In another embodiment, a fluoropolymer is used as an optional polymer in the thermoplastic composition, and the fluoropolymer, if present, is present in an amount of less than 10 weight %, specifically less than 5 weight %, and more specifically less than 2 weight %, and most specifically less than 1 weight %, based on 100 parts by weight of the thermoplastic composition.

In yet another embodiment, a polylactic acid polymer is used as an optional polymer in the thermoplastic composition, and the polylactic acid polymer, if present, is present in an amount of less than 5 weight %, specifically less than 2.5 weight %, based on 100 parts by weight of the mixture of the thermoplastic composition. In other embodiments, the polylactic acid polymer if present, is present in an amount that is less than 50 weight %, specifically less than or equal to 25 weight %, based on 100 parts by weight of the total polyester polymer content of the thermoplastic composition. In still other embodiments, the polylactic acid polymer, if present, is present in an amount that is less than 5 weight %, specifically less than 2.5 weight %, based on 100 parts by weight of the thermoplastic composition. In another embodiment, the thermoplastic composition does not contain any polylactic acid polymer.

In yet another embodiment, a poly(3-hydroxybutyrate-co-3-hydroxyvalerate) polymer is used as an optional polymer in the thermoplastic composition, and the poly(3-hydroxybutyrate-co-3-hydroxyvalerate) polymer, if present, is present in an amount that is less than 10 weight %, specifically less than 5 weight %, based on 100 parts by weight of the thermoplastic composition. In yet other embodiments, the poly (3-hydroxybutyrate-co-3-hydroxyvalerate) polymer, if present, is present in an amount that is less than 50 weight %, specifically less than or equal to 25 weight %, based on 100 parts by weight of the total polyester polymer content of the thermoplastic composition. In still other embodiments, the thermoplastic composition does not contain any poly(3-hydroxybutyrate-co-3-hydroxyvalerate).

In some applications the presence of polymers in the thermoplastic composition having significant contents of free OH (hydroxyl) groups may lead to melt, molecular weight, color and/or hydrolytic instability of the thermoplastic composition. Therefore for some applications it will be desirable to not use polymers having significant free OH (hydroxyl) contents. For example, the esterification reaction to prepare cellulose esters often does not go to full conversion, and cellulose esters often have a significant hydroxyl content as a result. For this reason, the thermoplastic composition will contain only relatively low amounts of cellulose esters as an optional component in many embodiments. In one embodiment, the thermoplastic composition further comprises optionally a cellulose ester, wherein the cellulose ester, if present, is present in an amount that is less than 10 weight % based on 100 parts by weight of the polyester polymer in the thermoplastic composition, specifically less than 5 weight %, and more specifically less than less than 1 weight %, based on 100 parts by weight of the thermoplastic composition. In still other embodiments the thermoplastic composition does not contain any cellulose esters.

In some embodiments, the thermoplastic composition further includes one or more impact modifier compositions to increase the impact resistance of the thermoplastic composition. In one embodiment, the thermoplastic composition comprises a mixture of from 10 to 98 weight % of a polycarbonate polymer, from 2 to 90 weight % of a polyester polymer comprising structures derived from a diol compound having the structure (A) HO—Z—OH, wherein Z is a $C_1$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH, from 0 to 5 weight % of a polylactic acid polymer, from 0 to 30 weight % of a filler, and from 0 to 30 weight % of an impact modifier, wherein the sum of the polycarbonate polymer, the polyester polymer, the polylactic acid polymer, the filler, and the impact modifier is equal to 100 weight %.

These impact modifiers may include an elastomer-modified graft copolymer comprising (i) an elastomeric (i.e., rubbery) polymer substrate having a Tg less than 10° C., more specifically less than −10° C., or more specifically −40° C. to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than 50 weight % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. As used herein, the terminology "(meth)acrylate monomers" refers collectively to acrylate monomers and methacrylate monomers.

Suitable conjugated diene monomers for preparing the elastomer (rubber) phase are of formula (10):

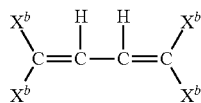

(10)

wherein each $X^b$ is independently hydrogen, $C_1$-$C_5$ alkyl, chlorine, or bromine or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene, 2-ethyl-1,3-pentadiene, 1,3- and 2,4-hexadienes, chloro and bromo substituted butadienes such as dichlorobutadiene, bromobutadiene, dibromobutadiene, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Example copolymers include copolymers of butadiene-styrene, butadiene-acrylonitrile, and the like. Alternatively, the backbone may be an acrylate rubber, such as one based on n-butyl acrylate, ethylacrylate, 2-ethylhexylacrylate, mixtures comprising at least one of the foregoing, and the like. Additionally, minor amounts of a diene may be copolymerized in the acrylate rubber backbone to yield improved grafting. Monomers that are suitable for copolymerization with the conjugated diene include monovinylaromatic monomers containing condensed aromatic ring structures, such as vinyl naphthalene, vinyl anthracene and the like, or monomers of formula (11):

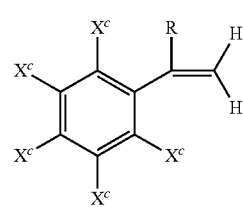

(11)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (12):

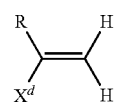

(12)

wherein R is hydrogen, $C_1$-$C_5$ alkyl, bromo, or chloro, and $X^d$ is cyano, $C_1$-$C_{12}$ alkoxycarbonyl, $C_1$-$C_{12}$ aryloxycarbonyl, hydroxy carbonyl, or the like. Examples of monomers of formula (10) include acrylonitrile, ethacrylonitrile, methacrylonitrile, alpha-chloroacrylonitrile, beta-chloroacrylonitrile, alpha-bromoacrylonitrile, beta-bromoacrylonitrile, acrylic acid, methyl(meth)acrylate, ethyl(meth)acrylate, n-butyl(meth)acrylate, t-butyl(meth)acrylate, n-propyl (meth)acrylate, isopropyl(meth)acrylate, 2-ethylhexyl(meth) acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl(meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 weight % of comonomers of formulas (10), (11), or (12). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomers. Optionally, up to 5 weight % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

Elastomer-modified graft copolymers may be polymerized by mass, emulsion, suspension, solution or combined processes such as bulk-suspension, emulsion-bulk, bulk-solution or other techniques, using continuous, semibatch, or batch processes. A variety of particle sizes of the elastomer substrate may be used. For example, an average particle size of 0.001 to 25 micrometers, specifically 0.01 to 15 micrometers, or even more specifically 0.1 to 8 micrometers may be used for emulsion based polymerized rubber lattices. A particle size of 0.5 to 10 micrometers, specifically 0.6 to 1.5 micrometers may be used for bulk polymerized rubber substrates. Particle size may be measured by simple light scattering methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70%. Also suitable are mixtures of butadiene with styrene and/or $C_{4-6}$ alkyl acrylate rubbers.

The elastomeric phase may provide 5 weight % to 95 weight % of the total graft copolymer, more specifically 20 weight % to 90 weight %, and even more specifically 40 weight % to 85 weight % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. An example of a suitable mixture comprises a monovinylaromatic hydrocarbon and an acrylic monomer. The above-described monovinylaromatic monomers of formula (11) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (11). In one embodiment, R is hydrogen or $C_1$-$C_2$ alkyl, and $X^d$ is cyano or $C_1$-$C_{12}$ alkoxycarbonyl. Specific examples of suitable comonomers for use in the rigid phase include acrylonitrile, ethacrylonitrile, methacrylonitrile, methyl(meth)acrylate, ethyl(meth)acrylate, n-propyl(meth)acrylate, isopropyl(meth)acrylate, and the like, and combinations comprising at least one of the foregoing comonomers. Examples of graft copolymers suitable for use include, but are not limited to, acrylonitrile-butadiene-styrene (ABS) and methacrylonitrile-butadiene-styrene (MBS) resins. Suitable high-rubber acrylonitrile-butadiene-styrene resins are available from SABIC Innovative Plastics as BLENDEX® grades 131, 336, 338, 360, and 415.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 weight % of monovinyl aromatic monomer, specifically 30 to 100 weight %, more specifically 50 to 90 weight % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise 40 weight % to 95 weight % elastomer-modified graft copolymer and 5 weight % to 65 weight % graft (co)polymer, based on the total weight of the impact modifier. In another embodiment, such impact modifiers comprise 50 weight % to 85 weight %, more specifically 75 weight % to 85 weight % rubber-modified graft copolymer, together with 15 weight % to 50 weight %, more specifically 15 weight % to 25 weight % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^g)C(O)OCH_2CH_2R^h$, wherein $R^g$ is hydrogen or a $C_1$-$C_8$ linear or branched hydrocarbyl group and $R^h$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (11) or (12), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from 30° C. to 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methacryloxypropyl)methyldimethoxysilane, to afford silicone rubber having an average particle size from 100 nanometers to 2 micrometers. At least one branched acrylate rubber monomer is then polymerized with the silicone rubber particles, optionally in the presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from 100 nanometers to 2 micrometers.

If desired, the foregoing types of impact modifiers may be prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines, or any other material, such as an acid, that contains a degradation catalyst. Such materials are commonly used as surfactants in emulsion polymerization, and may catalyze transesterification and/or degradation of polycarbonate polymers. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. This emulsion polymerization process is described and disclosed in various patents and literature of such companies as Rohm & Haas and General Electric Company (now SABIC Innovative Plastics).

A specific impact modifier of this type is a methyl methacrylate-butadiene-styrene (MBS) impact modifier wherein the butadiene substrate is prepared using above-described sulfonates, sulfates, or phosphates as surfactants. Other examples of elastomer-modified graft copolymers besides ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES).

In some embodiments, the impact modifier is a graft polymer having a high rubber content, i.e., greater than or equal to 50 weight %, optionally greater than or equal to 60 weight %, of the graft polymer. The rubber is preferably present in an amount less than or equal to 95 weight %, specifically less than or equal to 90 weight % of the graft polymer.

The thermoplastic composition may optionally comprise a polycarbonate-polysiloxane copolymer comprising polycarbonate blocks and polydiorganosiloxane blocks. The polycarbonate blocks in the copolymer comprise repeating structural units of formula (1) as described above, for example wherein $R^1$ is of formula (2) as described above. These units may be derived from reaction of dihydroxy compounds of formula (3) as described above. In one embodiment, the dihydroxy compound is bisphenol A, in which each of $A^1$ and $A^2$ is p-phenylene and $Y^1$ is isopropylidene.

The polydiorganosiloxane blocks comprise repeating structural units of formula (13) (sometimes referred to herein as 'siloxane'):

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

The value of D in formula (13) may vary widely depending on the type and relative amount of each component in the thermoplastic composition, the desired properties of the composition, and like considerations. Generally, D may have an average value of 2 to 1000, specifically 2 to 500, more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (14):

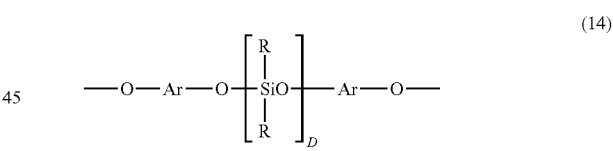

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (14) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Such units may be derived from the corresponding dihydroxy compound of the following formula (15):

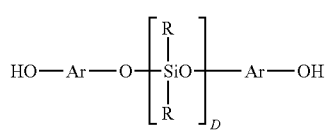

(15)

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (16):

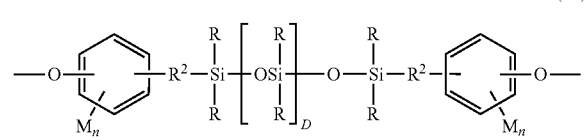

(16)

wherein R and D are as defined above. $R^2$ in formula (16) is a divalent $C_2$-$C_8$ aliphatic group. Each M in formula (16) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (17):

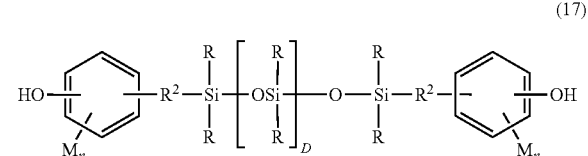

(17)

wherein R, D, M, $R^2$, and n are as described above.

Such dihydroxy polysiloxanes can be made by effecting a platinum catalyzed addition between a siloxane hydride of the formula (18),

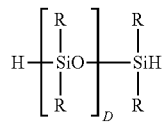

(18)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polycarbonate-polysiloxane copolymer may be manufactured by reaction of diphenolic polysiloxane (17) with a carbonate source and a dihydroxy aromatic compound of formula (3), optionally in the presence of a phase transfer catalyst as described above. Suitable conditions are similar to those useful in forming polycarbonate polymers. For example, the copolymers are prepared by phosgenation, at temperatures from below 0° C. to 100° C., preferably 25° C. to 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, i.e., may be 1 weight % to 99 weight % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to 1000), and the type and relative amount of each component in the thermoplastic composition, including the type and amount of polycarbonate polymer, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising 1 weight % to 75 weight %, or 1 weight % to 50 weight % polydimethylsiloxane, or an equivalent molar amount of another polydiorganosiloxane. In one embodiment, the copolymer comprises 5 weight % to 40 weight %, specifically 5 weight % to 25 weight % polydimethylsiloxane, or an equivalent molar amount of another polydiorganosiloxane, with the balance being polycarbonate polymer. In a particular embodiment, the copolymer may comprise about 20 weight % siloxane.

In one embodiment, the impact modifier is ABS, MBS, ASA, polycarbonate-polysiloxane copolymer, or a combination of two or more of the foregoing impact modifiers. In a second embodiment, the impact modifier is ABS, MBS, or a combination of these two impact modifiers.

In some embodiments, the thermoplastic composition further comprises an ungrafted rigid copolymer. In one embodiment, the ungrafted rigid copolymer comprises acrylonitrile monomer. The rigid copolymer is additional to any rigid copolymer present in the impact modifier. It may be the same as any of the rigid copolymers described above, without the elastomer modification. The rigid copolymers generally have a Tg greater than 15° C., specifically greater than 20° C., and include, for example, polymers derived from monovinylaromatic monomers containing condensed aromatic ring structures, such as vinyl naphthalene, vinyl anthracene and the like, or monomers of formula (11) as broadly described above, for example styrene and alpha-methyl styrene; monovinylic monomers such as itaconic acid, acrylamide, N-substituted acrylamide or methacrylamide, maleic anhydride, maleimide, N-alkyl, aryl or haloaryl substituted maleimide, glycidyl (meth)acrylates, and monomers of the general formula (12) as broadly described above, for example acrylonitrile, methyl acrylate and methyl methacrylate; and copolymers of the foregoing, for example styrene-acrylonitrile (SAN), styrene-alpha-methyl styrene-acrylonitrile, methyl methacrylate-acrylonitrile-styrene, and methyl methacrylate-styrene.

The rigid copolymer may comprise 1 to 99 weight %, specifically 20 to 95 weight %, more specifically 40 to 90 weight % of vinylaromatic monomer, together with 1 to 99 weight %, specifically 5 to 80 weight %, more specifically 10 to 60 weight % of copolymerizable monovinylic monomers. In one embodiment the rigid copolymer is SAN, which may comprise 50 to 99 weight % styrene, with the balance acrylonitrile, specifically 60 to 90 weight % styrene, and more specifically 65 to 85 weight % styrene, with the remainder acrylonitrile.

In another embodiment, the ungrafted rigid copolymer comprises a (meth)acrylate monomer. The rigid copolymers include, for example, a poly(alkyl(meth)acrylate), wherein the alkyl group is straight or branched-chain, and has 1 or 2 carbons atoms. In one embodiment the rigid copolymer is a poly(alkyl(meth)acrylate), specifically a poly(methyl methacrylate) (PMMA). PMMA may be produced by the polymerization of methyl methacrylate monomer, and may be derived by (1) the reaction of acetone cyanohydrin, methanol, and sulphuric acid or (2) the oxidation of tert-butyl alcohol to methacrolein and then to methacrylic acid followed by the esterification reaction with methanol. As is known, PMMA homopolymer is difficult to obtain, and therefore is available commercially and used herein as a mixture of the homopolymer and various copolymers of methyl methacrylate and $C_1$-$C_4$ alkyl acrylates, such as ethyl acrylate. "PMMA" as used herein therefore includes such mixtures, which are commercially available from, for example, Atofina under the trade designations V825, V826, V920, V045, and VM, and from Lucite under the trade names CLG340, CLG356, CLG960, CLG902, CMG302.

In one embodiment, the ungrafted rigid copolymer comprises acrylonitrile or methacrylate units. In another embodiment, the ungrafted rigid copolymer is SAN or PMMA. In still another embodiment, the ungrafted rigid copolymer is SAN. Blends comprising more than one ungrafted rigid copolymer may also be used, if desired.

The rigid copolymer may be manufactured by bulk, suspension, or emulsion polymerization. In one embodiment, the rigid copolymer is manufactured by bulk polymerization using a boiling reactor. The rigid copolymer may have a weight average molecular weight of 50,000 to 300,000 Daltons, specifically of 50,000 to 200,000 Daltons, as measured by GPC using polystyrene standards.

In addition to the polycarbonate polymer, the polyester polymer, the optional polylactic acid polymer, and the previously mentioned optional impact modifier and optional ungrafted rigid copolymer, the thermoplastic composition may optionally include various additives such as quenchers, flow promoters, antioxidants, heat stabilizers, anti-hydrolysis stabilizers, light stabilizers, UV absorbers, plasticizers, lubricants, mold release agents, anti-static agents, pigments, dyes, flame retardants, anti-drip agents, blowing agents, and the like, with the proviso that the additives do not adversely affect the desired properties of the thermoplastic compositions. Mixtures of two or more additives may be used. Such additives may be mixed at a suitable time during the mixing of the components for forming the composition.

In one embodiment, the thermoplastic composition consists essentially of a mixture of from 10 to 98 weight % of a polycarbonate polymer, from 2 to 90 weight % of a polyester polymer comprising structures derived from a diol compound having the structure (A) HO—Z—OH, wherein Z is a $C_1$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH, from 0 to 30 weight % of a filler, from 0 to 30 weight % of an impact modifier, and from 0 to 20 weight % of an additive, wherein the additive is a quencher, a flow promoter, an antioxidant, a heat stabilizer, an anti-hydrolysis stabilizer, a light stabilizer, an UV absorber, a plasticizer, a lubricant, a mold release agent, an anti-static agent, a pigment, a dye, a flame retardant, an anti-drip agent, a blowing agent, or a combination of two or more of the foregoing additives, and wherein the sum of the polycarbonate polymer, the polyester polymer, the filler, the impact modifier, and the additive is equal to 100 weight %.

The thermoplastic composition optionally comprises a quencher to quench, inactivate or deactivate undesirable components and for stabilizing the thermoplastic composition, such as an acid, acid salt, ester of an acid or their combinations. The addition of the acid or its salt or ester often deactivates transesterification catalysts, polycarbonate synthesis or condensation catalysts. Particularly useful classes of acids, acid salts and esters of acids are those derived from a phosphorous containing acid such as phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, fluorohypophosphoric acid or their combinations. In one embodiment a combination of a phosphorous containing acid and an ester of a phosphorous containing acid is used. Alternatively, acids, acid salts and esters of acids, such as, for example, sulphuric acid, sulphites, mono zinc phosphate, mono calcium phosphate, mono natrium phosphate, and the like, may be used. The acids, acid salts and esters of acids are used in very small levels to quench or inactivate, and when they are used in greater levels it is known that there may be polycarbonate degradation. The quencher is typically added or pre-blended with the polycarbonate polymer of the thermoplastic composition in an amount of from 0.01 to 0.05 weight % based on 100 parts by weight of the thermoplastic composition.

The thermoplastic composition optionally comprises a flow promoter to improve flow and other properties, such as a low molecular weight hydrocarbon resin. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Examples of commercially suitable low molecular weight hydrocarbon resins derived from petroleum $C_5$ to $C_9$ feedstock include the following: hydrocarbon resins available from Eastman Chemical under the trademark Piccotac®, the aromatic hydrocarbon resins available from Eastman Chemical under the trademark Picco®, the fully hydrogenated alicyclic hydrocarbon resin based on $C_9$ monomers available from Arakawa Chemical Inc. under the trademark Arkon® and sold, depending on softening point, as Arkon® P140, P125, P115, P100, P90, P70 or the partially hydrogenated hydrocarbon resins sold as Arkon® M135, M115, M100 and M90, the fully or partially hydrogenated hydrocarbon resin available from Eastman Chemical under the tradename Regalite® and sold, depending on softening point, as Regalite® R1100, S1100, R1125, R1090 and R1010, or the partially hydrogenated resins sold as Regalite® R7100, R9100, S5100 and S7125, the hydrocarbon resins available from Exxon Chemical under the trade Escorez®, sold as the Escorez® 1000, 2000 and 5000 series, based on $C_5$, $C_9$ feedstock and mixes thereof, or the hydrocarbon resins sold as the Escorez® 5300, 5400 and 5600 series based on cyclic and $C_9$ monomers, optionally hydrogenated and the pure aromatic monomer hydrocarbon resins such as for instance the styrene, α-methyl styrene based hydrocarbon resins available from Eastman Chemical under the tradename Kristalex®. Low molecular weight hydrocarbon resins are generally used in amounts of 0.1 to 10 parts by weight based on 100 parts by weight of the thermoplastic composition.

Radical species may cause undesired oxidative degradation or crosslinking reactions, especially during extrusion and other melt-forming processes, which may discolor the thermoplastic composition or alter its Theological and mechanical properties. Therefore in some embodiments, the thermoplastic composition further comprises optionally a radical reaction initiator such as a peroxide or a residue of a radical reaction initiator, wherein the radical reaction initiator or a residue of a radical reaction initiator, if present, is present in an amount of less than 0.001 weight %, specifically less than 0.0001 weight %, based on 100 parts by weight of the thermoplastic composition. In other embodiments, the thermoplastic composition will not contain any radical reaction initiator species or residues of radical reaction initiator species.

The compositions described herein may further comprise a primary antioxidant or "stabilizer" (e.g., a hindered phenol and/or secondary aryl amine) and, optionally, a secondary antioxidant (e.g., a phosphate and/or thioester). Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. In some embodiments, the thermoplastic composition further comprises antioxidants in amounts of 0.01 to 1 weight %, specifically 0.05 to 0.5 weight %, based on 100 parts by weight of the thermoplastic composition.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. In some embodiments, the thermoplastic composition further comprises heat stabilizers in amounts of 0.01 to 3 weight %, specifically 0.05 to 0.5 weight %, based on 100 parts by weight of the thermoplastic composition.

Anti-hydrolysis stabilizer additives may be used to improve the hydrolytic stability of the thermoplastic composition. Suitable anti-hydrolysis stabilizer additives include, for example, alicyclic diepoxy carboxylate compounds, aromatic polycarbodiimides, modified styrene acrylic polymers, and ethylene-glycidyl methacrylate-methyl acrylate copolymers may be used. Specific examples of such additives include methyl 3,4-epoxycyohexyl-carboxylate (CAS #2386-87-0), such as CELLOXIDE™ 2021P from Daicel Chemical Industries, aromatic polycarbodiimide (CAS #81972-48-7) such as STABAXOL™ P from Rhein Chemi, and modified styrene acrylic polymers such as CESA™ 9900 from Johnson Polymer. The amount of anti-hydrolysis stabilizer contained in the thermoplastic composition may be adjusted depending on its chemical structure and the relative amounts and nature of the other components in the thermoplastic composition. In some embodiments, the thermoplastic composition further comprises from 0.01 to 5 weight %, specifically 0.5 to 3 weight %, of an anti-hydrolysis stabilizer additive based on 100 parts by weight of the thermoplastic composition. In specific embodiments, the thermoplastic composition further comprises from 0.5 to 5 weight % of methyl 3,4-epoxycyohexyl-carboxylate (CAS #2386-87-0), alternatively from 0.5 to 2.5 weight % aromatic polycarbodiimide (CAS #81972-48-7), alternatively from 0.01 to 0.5 weight % a modified styrene acrylic, based on 100 parts by weight of the thermoplastic composition.

Light stabilizers and/or ultraviolet (UV) absorber additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. In some embodiments, the thermoplastic composition further comprises from 0.01 to 10 weight %, specifically 0.1 to 1 weight %, of light stabilizers based on 100 parts by weight of the thermoplastic composition.

Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[[(2-cyano-3,3-diphenylacryloyl)oxy]-2,2-bis[[(2-cyano-3,3-diphenylacryloyl)oxy]methyl] propane (UVINUL™ 3030); 2,2'-(1,4-phenylene)bis(4H-3,1-benzoxazin-4-one); 1,3-bis[[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations comprising at least one of the foregoing UV absorbers. In some embodiments, the thermoplastic composition further comprises from 0.1 to 5 weight % of a UV absorber based on 100 parts by weight of the thermoplastic composition.

Plasticizers, lubricants, and/or mold release agents may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. In some embodiments, the thermoplastic composition further comprises from 0.1 to 20 weight %, specifically 0.3 to 10 weight %, of such materials based on 100 parts by weight of the thermoplastic composition.

The term "anti-static agent" refers to monomeric, oligomeric, or polymeric materials that can be processed into polymer resins and/or sprayed onto materials or articles to improve conductive properties and overall physical performance. Examples of monomeric anti-static agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium alkyl sulfonates, sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric anti-static agents. Sodium alkyl sulfonates are commercially available, such as, for example, Hostastat® HS1 (Clariant) and Atmer™ 191 (Croda) anti-static agents.

Exemplary polymeric anti-static agents include certain polyesteramides, polyether-polyamide (polyetheramide) block copolymers, polyetheresteramide block copolymers, polyetheresters, or polyurethanes, each containing polyalkylene glycol moieties such as polyethylene glycol, polypropylene glycol, polytetramethylene glycol, and the like. Such polymeric anti-static agents are commercially available, such as, for example, Pelestat™ 6321 (Sanyo), Pebax™ MH1657 (Atofina), and Irgastat™ P18 and P22 (Ciba-Geigy). Other polymeric materials that may be used as anti-static agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical anti-static agents to render the composition electrostatically dissipative. In some embodiments, the thermoplastic composition further comprises from 0.1 to 10 weight % of an anti-static agent based on 100 parts by weight of the thermoplastic composition.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. In some embodiments, the thermoplastic composition further comprises from 0.001 to 10 weight % of pigments based on 100 parts by weight of the thermoplastic composition.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7- diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. In some embodiments, the thermoplastic composition further from 0.0001 to 3 weight % of dyes based on 100 parts by weight of the thermoplastic composition.

Suitable flame retardants that may be added may be organic compounds that include phosphorus, bromine, and/or chlorine. Non-brominated and non-chlorinated phosphorus-containing compounds may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below (19A-19D):

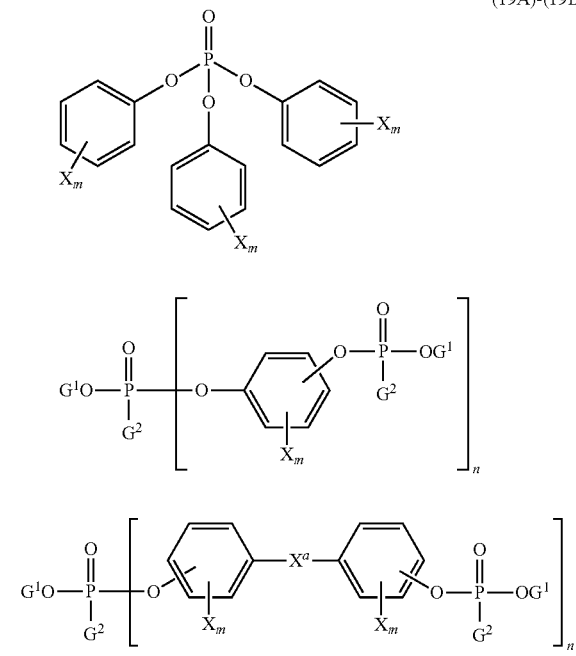

(19A)-(19D)

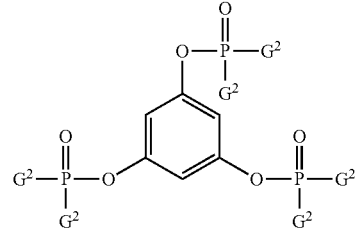

-continued wherein each $G^1$ is independently a hydrocarbon having 1 to 30 carbon atoms; each $G^2$ is independently a hydrocarbon or hydrocarbonoxy having 1 to 30 carbon atoms; each $X^a$ is as defined above; each X is independently a bromine or chlorine; m is 0 to 4, and n is 1 to 30. Examples of suitable di- or polyfunctional aromatic phosphorus-containing compounds include triphenyl phosphate (TPP), resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like. In an embodiment, bisphenol A bis(diphenylphosphate) is used as a flame retardant.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide, or the like.

Various amounts of phosphorus-containing compound may be used as flame retardants. In some embodiments, the thermoplastic composition further comprises from 0.5 and 20 weight %, specifically between 5 and 15 weight %, of phosphorus-containing compound based on 100 parts by weight of the thermoplastic composition. In specific embodiments, the phosphorus-containing compound is bisphenol A bis(diphenylphosphate).

Halogenated materials may also be used as flame retardants, for example halogenated compounds and resins of formula (20):

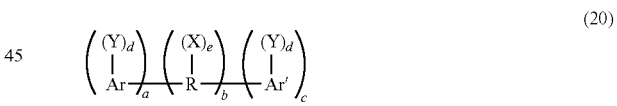

(20)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (20) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided that there is at least one and optionally two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar', can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant.

Inorganic flame retardants may also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of phosphinic acid or carbonic acid, such as $Na_2CO_3$, $K_2CO_3$, $MgCO_3$, $CaCO_3$, and $BaCO_3$ or a fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Such phosphinic acid salts are commercially available, such as, for example, Exolit® OP (Clariant) flame retardants.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is also known as TSAN. Such TSAN anti-drip agents are commercially available, such as, for example, Blendex® (SABIC-IP). Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, 50 weight % PTFE and 50 weight % SAN, based on the total weight of the encapsulated fluoropolymer. The SAN may comprise, for example, 75 weight % styrene and 25 weight % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. In an embodiment, a fluoropolymer is used as an anti-drip agent. In a specific embodiment, the thermoplastic composition further comprises from 0.1 to 1 weight % fluoropolymer, specifically TSAN, based on 100 parts by weight of the thermoplastic composition. In another embodiment, the thermoplastic composition may also further comprise bisphenol A bis(diphenylphosphate) in addition to the fluoropolymer, specifically TSAN.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon dioxide or ammonia gas, such as azodicarbonamide, metal salts of azodicarbonamide, 4,4' oxybis(benzenesulfonylhydrazide), sodium bicarbonate, ammonium carbonate, or the like; or combinations comprising at least one of the foregoing blowing agents.

The relative amount of each component of the thermoplastic composition will depend on the particular type of polycarbonate and polyester polymers used, the presence of any other resins such as the optional polylactic acid polymer, and the particular optional impact modifier(s), and the particular optional rigid graft copolymer(s), as well as the desired properties of the composition. Particular amounts may be readily selected by one of ordinary skill in the art using the guidance provided herein.

In one embodiment, the thermoplastic composition comprises 10 to 98 weight % of a polycarbonate polymer, 2 to 90 weight %, specifically from 5 to 40 weight %, more specifically 5 to 15 weight %, of the polyester polymer, and 0 to 5 weight % of a polylactic acid polymer, and wherein the sum of the polycarbonate polymer, the polyester polymer, and the polylactic acid polymer equals 100 weight. In another embodiment, the thermoplastic composition additionally comprises 0 to 30 weight %, specifically 5 to 15 weight %, of a filler, wherein the sum of the polycarbonate polymer, the polyester polymer, the polylactic acid polymer, and the filler equals 100 weight %. In still another embodiment, the thermoplastic composition additionally comprises 0 to 30 weight %, specifically 5 to 15 weight %, of a filler, and 0 to 30 weight % of an impact modifier, wherein the sum of the polycarbonate polymer, the polyester polymer, the polylactic acid polymer, the filler, and the impact modifier equals 100 weight %.

In another embodiment, the thermoplastic composition consists essentially of 10 to 98 weight % of a polycarbonate polymer, 2 to 90 weight % of the polyester polymer, 0 to 30 weight % of a filler, 0 to 30 weight % of an impact modifier, and 0 to 20 weight % of an additive wherein the sum of the polycarbonate polymer, the polyester polymer, the filler, the impact modifier, and the additive equals 100 weight %. In yet another embodiment, the thermoplastic composition consists essentially of 10 to 98 weight % of a polycarbonate polymer, 2 to 90 weight % of the polyester polymer, and from 0 to 5 weight % of a polylactic acid polymer wherein the sum of the polycarbonate polymer, the polyester polymer, and the polylactic acid polymer equals 100 weight %.

The thermoplastic compositions may be manufactured by methods generally available in the art, for example, in one embodiment, in one manner of proceeding, the polycarbonate polymer and the polyester polymer and the optional polylactic acid polymer and any other optional components (such as antioxidants, mold release agents, and the like) are first blended, in a Henschel™ high speed mixer or other suitable mixer/blender. Other low shear processes including but not limited to hand mixing may also accomplish this blending. The blend is then fed into the throat of a throat of a single- or twin-screw extruder or a Banbury mixer, or their combination via a hopper. Alternatively, one or more of the components may be incorporated into the composition by feeding directly into the extruder at the throat and/or downstream through a sidefeeder or sidestuffer. In one embodiment, a portion of the polyester polymer is fed to the extruder upstream at the throat and another portion is fed to the extruder downstream. In a specific embodiment, 30 to 70 weight % of the polyester polymer is fed upstream and 70 to 30 weight % of the polyester polymer is fed downstream, wherein the sum of the upstream portion and the downstream portion is equal to 100 weight %. In another specific embodiment, 50 weight % of the polyester polymer is fed upstream and 50 weight % of the polyester polymer is fed downstream, wherein the sum of the upstream portion and the downstream portion is equal to 100 weight %. Additives may also be compounded into a masterbatch with a desired polymeric resin and fed into the extruder. The extruder is generally operated at a temperature higher than that necessary to cause the composition to flow. The extrudate is generally immediately quenched in a water batch and pelletized. The pellets, so prepared, when cutting the extrudate may be one-fourth inch long or less as desired. Such pellets may be used for subsequent molding, shaping, or forming.

In one embodiment, a thermoplastic composition is prepared in a process comprising the step of blending a coated natural fiber with a polycarbonate polymer and the polyester polymer and other optional components. In a specific embodiment, the coated natural fiber has been coated in a spray coating process prior to the blending step. In other specific embodiments, the coating composition of the natural fiber reacts with the natural fiber or at least one of the other components of the thermoplastic composition during a blending, extrusion or molding process to release hydrogen, water or alcohol.

In some embodiments, radical reaction initiator species such as organic peroxides, if present as an optional component, will be present in an amount of less than 0.001 weight %, specifically less than 0.0001 weight %, based on 100 parts by weight of the thermoplastic composition during its preparation by blending, low shear mixing processes or extrusion of its components. In other embodiments, radical reaction initiator species will be absent during the preparation.

Shaped, formed, or molded articles comprising the thermoplastic compositions are also provided. The thermoplastic compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, electronic device casings and signs and the like. In addition, the thermoplastic compositions may be used for such applications as automotive panel and trim. Examples of suitable articles are exemplified by but are not limited to aircraft, automotive, truck, military vehicle (including automotive, aircraft, and water-borne vehicles), scooter, and motorcycle exterior and interior components, including panels, quarter panels, rocker panels, trim, fenders, doors, decklids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings; personal water-craft; jet-skis; pools; spas; hot tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; hand held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, painting, lasermarking, welding, gluing and/or thermoforming. The articles made from the composition of the present invention may be used widely in the automotive, home appliance, electrical component, and telecommunication industries.

One skilled in the art will understand that the combination of the subject matters of the various claims and embodiments of the invention is possible without limitation in the invention. For example, the subject matter of one claim may be combined with the subject matter of one or more of the other claims without limitation to the extent that such combinations are technically feasible. In this combination of subject matters, the subject matter of any one thermoplastic composition claim may be combined with the subject matter of one or more other thermoplastic composition claims. By way of example, the subject matter of claim 1 may be combined with the subject matter of any one of claims 2 to 18. In one embodiment, the subject matter of claim 9 is combined with the subject matter of any one of claims 2 to 4. In another embodiment, the subject matter of claim 17 is combined with the subject matter of any one of claims 6 to 9. In one specific embodiment, the subject matter of claim 1 is combined with that of claim 2. In a second specific embodiment, the subject matter of claim 17 is combined with that of claim 3. In a third specific embodiment, the subject matter of claim 5 is combined with that of claim 14. In a fourth specific embodiment, the subject matter of claim 1 is combined with the subject matter of claim 18, By way of another example, the subject matter of claim 1 may also be combined with the subject matters of any two of claims 2 to 18. In one embodiment, the subject mater of claim 1 is combined with the subject matters of any two claims 2 to 4. In another embodiment, the subject matter of claim 5 is combined with the subject matters of any two of claims 6 to 11. In a specific embodiment, the subject matter of claim 1 is combined with the subject matters of claim 2. In another specifc embodiment, the subject matter of claim 11 is combined with the subject matters of claims 2 and 18. In a third specific embodiment, the subject matter of claim 5 is combined with the subject matters of claim 2. In a fourth specific embodiment, the subject matter of claim 1 is combined with the subject matters of claims 4 and 13. By way of another example, the subject matter of claim 1 may also be combined with the subject matters of any three of claims 2 to 4 and 5 to 18. In one specific embodiment, the subject matter of claim 1 is combined with the subject matters of claims 2 and 4. In a second specific embodiment, the subject matter of claim 11 is combined with the subject matters of claims 2, 15, and 16. In a third specific embodiment, the subject matter of claim 5 is combined with the subject matters of claims 11 and 16. In a fourth specific example, the subject matter of claim 17 is combined with the subject matters of claims 3 and 4. By way of example, the subject matter of any one claim may be combined with the subject matters of any number of the other claims without limitation to the extent that such combinations are technically feasible.

In an analogous manner, any one embodiment of the invention may be combined with any number of the other embodiments of the invention without limitation to the extent that such combinations are technically feasible. In this combination of embodiments, any embodiment may be combined with one or more other embodiments. For example, any number of embodiments related to the process for making the thermoplastic compositions of the invention may be combined with one another, any number of embodiments related to the thermoplastic composition of the invention may be combined with one another, any number of embodiments related to the process for making the thermoplastic compositions may be combined with any number of embodiments related to the thermoplastic compositions.

The compositions are further illustrated by the following non-limiting examples, which were prepared from the components set forth in Table 1. One of the components was made in-house, as noted, at the GE China Technology Center. Each of the example compositions was prepared according to formulations in Tables 2 to 14. All amounts are in weight % unless otherwise noted, and all compositions further include 0.15 weight % of a mold release agent (PETS), 0.08 weight % of UV stabilizer (Irganox™ 1076) and 0.08 weight % of thermal stabilizer (Irgaphos™ 168). In each of the examples, samples were prepared by melt extrusion and compounding on a Toshiba co-rotating twin-screw extruder (37 millimeter screw) using a melt temperature range of 150 to 230° C. and 150 rpm. The PBS was fed to the extruder in two split streams (upstream and downstream), except where noted otherwise. The extrudate was pelletized and dried at 85° C. for 4 hours then subsequently molded at a temperature of 220 to 230° C. on a Fanuc A injection molding machine.

TABLE 1

| Material | Description | Source |
|---|---|---|
| PC-1 | high flow BPA polycarbonate polymer resin made by the interfacial process, with a Mw of about 21,800 Daltons versus polycarbonate standards | SABIC Innovative Plastics |
| PC-2 | low flow BPA polycarbonate polymer resin made by the interfacial process with a Mw of about 29,900 Daltons versus polycarbonate standards | SABIC Innovative Plastics |
| PC-3 | BPA polycarbonate/siloxane copolymer, 80/20 weight %/weight %, PCP endcapped | SABIC Innovative Plastics |
| ABS | high rubber graft emulsion polymerized ABS comprising about 11 weight % acrylonitrile, 38 weight % styrene grafted with about 50 weight % polybutadiene with a crosslink density of about 47% | SABIC Innovative Plastics |
| MBS | poly(methylmethacrylate-co-butadiene-co-styrene) powder (Rohm and Haas Grade EXL2691A) | Rohm and Haas |
| SAN | bulk polymerized SAN copolymer with an acrylonitrile content 26 to 28%, with a molecular weight of about 170,000 Daltons versus polystyrene standards | SABIC Innovative Plastics |
| PETS | Pentaerythritol tetrastearate | Faci |
| AO-1 | primary antioxidant (IRGANOX ™ 1076: hindered phenol) | Ciba |
| AO-2 | secondary antioxidant (IRGAFOS ™ 168: phosphite) | Ciba |
| PBS-1 | Polybutylene succinate, AZ 91T, Mw of about 20,800 Daltons versus polystyrene standards | Mitsubishi Chemical |
| PBS-2 | Polybutylene succinate, Bionelle 1001, Mw of about 24,200 Daltons versus polystyrene standards | Showa |
| PBS-3 | Polybutylene succinate, Bionelle 1020, Mw of about 15,700 Daltons versus polystyrene standards | Showa |
| PHBV | poly(3-hydroxybutyrate-co-3-hydroxyvalerate) | Tianan Biologic Material |
| PLA | polylactic acid polymer | NatureWorks |
| Talc-1 | talc (magnesium silicate hydrate) | Hayashi kasei |
| Talc-2 | LUZENAC ™ fine talc (magnesium silicate hydrate) | Luzenac Europe |
| NF-1 | natural fiber (jute/kenaf fiber ~10 mm in length) from which lignin had been removed but which was not subsequently surface treated with a siloxane | Jiangsu Redbud Dyeing Technology |
| NF-2 | 2 weight % TSF484 siloxane-coated natural fiber (weight % is based on 100 parts per weight of the natural fiber) | prepared in house |
| GF | non-bonding glass fiber | SABIC Innovative Plastics |

TABLE 1-continued

| Material | Description | Source |
|---|---|---|
| MAH-g-ABS | polymaleic anhydride-graft-ABS | SABIC Innovative Plastics |
| AH-1 | Alicyclic diepoxy carboxylate: methyl 3,4-epoxycyohexyl-carboxylate (CELLOXIDE ™ 2021P) | Daicel Chemical Industries |
| AH-2 | Aromatic polycarbodiimide (STABAXOL ™ P - PRILLS) | Rhein Chemie |
| AH-3 | Modified styrene acrylic polymer (CESA ™ 9900, Johnson Polymer Grade ADR 4368) | Johnson Polymer |
| AH-4 | Terpolymer impact modifier: Ethylene-glycidyl methacrylate-methyl acrylate copolymer | SABIC Innovative Plastics |
| FR-1 | TSAN: PTFE encapsulated in SAN (50/50 weight %/weight %) | SABIC Innovative Plastics |
| FR-2 | BPADP: bisphenol A bis(diphenylphosphate) | Nagase |

Some of the example compositions were extruded together with coated natural fiber (NF-2). Prior to the fiber coating treatment, kenaf fiber was dried at a temperature of 80 to 120° C. overnight, and ground at an elevated temperature of between 120 and 200° C. into a form having an aspect ratio of between 4 and 80. The ground kenaf fiber was then treated with 2 weight % polymethylhydrogensiloxane (TSF484, Momentive Performance Materials) in a 2-propanol solution in a high-speed superfloater (Kawata CTM100). Upon treatment, the kenaf fibers were spread into a stainless steel container in a temperature-controlled oven, and the oven temp was set at 105° C. with a temperature ramp of 5° C./min and held for 24 hours.

The compositions of Tables 2 to 14 were tested as compounded pellets for melt Mass-Flow-Rate (MFR) according to ASTM D 1238 at a temperature of 230° C. and loading of 10 kg. The same compositions were tested as molded samples for Notched Impact (NII) according to ASTM D256, Heat Deflection Temperature (HDT) according to ASTM D648, Tensile properties (TS=tensile strength, TM=tensile modulus) and Flexural properties (FS=flexural strength, FM=flexural modulus) according to ASTM D638 and ASTM D790, respectively. Five or more replicate molded bars were tested for each sample measurement. It was noted in the NII measurements whether the failure mode was brittle or ductile in nature. Brittle failure means that the molded bar completely broke into unconnected pieces in the test, and ductile failure means that the pieces of the molded bar remained connected after the test. The % ductility was calculated by dividing the number of bars of that sample that underwent ductile failure by the total number of bars of that sample tested in the NII test. For a few samples, no yielding took place in the tensile test, and the lack of yield is noted by a "-" sign in the tables. Some of the molded samples were additionally tested as to their NII, tensile, and flexural properties after they had been exposed in an "hydrolytic aging test" for various periods of time up to 200 hours, as noted in Table 10, to conditions of 80° C. and 95% relative humidity (RH) in a chamber having a controlled atmosphere and temperature. Some of the thermoplastic composition samples were tested also as to flammability according to UL94. Using this test protocol, 10 bars of the specified thickness of each sample type were tested. In this test a standardized flame is applied to a vertically placed test specimen of a specified thickness for 10 sec. The flame is then removed, and the time to stop burning/glowing (t1) is noted. Directly after burning stops, this procedure is repeated, noting the new time to stop burning/glowing (t2). The total flame-out-time is recorded as the sum of t1 and t2. It is also noted if any dripping occurs and if dripping material causes the cotton wool placed under the sample to ignite. Based on the test results, it was then determined if the sample composition passed a particular testing requirement (e.g. V0, V1, or V2) and what the flame out time (FOT) and number of flaming drips was for each sample composition.

TABLE 2

| Component | Unit | Illustr. 1 | Illustr. 2 | Illustr. 3 | Illustr. 4 |
|---|---|---|---|---|---|
| Composition | | | | | |
| PC-1 | Weight % | 15.12 | 15 | 15 | 15 |
| PC-2 | Weight % | 75.58 | 74.7 | 74.7 | 74.7 |
| ABS | Weight % | 9 | 0 | 0 | 0 |
| PBS-1 | Weight % | | 10 | | |
| PLA | Weight % | | | 10 | |
| PHBV | Weight % | | | | 10 |
| Properties | | | | | |
| MFR | g/10 min | 4.1 | 5.8 | 5.3 | 30.3 |
| NII | Ductility % | 100 | 100 | 0 | 100 |
| | J/m | 798 | 865 | 154 | 422 |
| HDT@ 3.2 mm | deg C. | 121 | 114 | 120 | 98 |
| TS@ break | MPa | 46 | 55 | 59 | 35 |
| TS@ yield | MPa | 52 | 52 | 58 | — |
| TM | MPa | 2078 | 2012 | 2330 | 2247 |
| Elong. @ break | % | 67 | 93 | 100 | 3.7 |
| Elong. @ yield | % | 5.7 | 5.7 | 5.8 | — |
| FM | MPa | 1980 | 1840 | 2170 | 1920 |
| FS@ yield | MPa | 85.5 | 82.4 | 95.4 | 80.8 |
| FS@ break | MPa | 83.9 | 80.8 | 93.6 | 79.3 |

Table 2 compares the properties of thermoplastic compositions containing PC and the same amount of three different biosourced polymers, PBS, PLA and PHBV. Illustration 1, which contains PC and ABS, is included as a reference. The results of Table 2 show that the modulus properties of the thermoplastic compositions containing the biosourced polymers are about the same or better than the reference blend. However only the thermoplastic composition containing the biosourced polymer PBS has an improved notched impact value relative to the reference thermoplastic composition (Illustration 1); the notched impact values are decreased by about a factor of 2 to 4 for the blends containing the other two biosourced polymers PLA (Illustration 3) and PHBV (Illustration 4). In addition, the thermoplastic composition containing PHBV has a very low % elongation at break. Therefore these Illustrations demonstrate that thermoplastic compositions comprising a polycarbonate polymer and the polyester polymer of the invention have an improved property balance versus blends of the polycarbonate polymer with either of the other biosourced polymers PLA or PHBV.

Table 3 demonstrates that thermoplastic compositions comprising a polycarbonate polymer and the polyester polymer, in this case PBS, may also contain additional other biosourced polymers such as PLA. Although all of the thermoplastic compositions have similar acceptable notched impact properties, the Illustrations show that care must be taken not to introduce too much PLA to the thermoplastic composition. For example, a comparison of the properties of Illustrations 5 and 6 with those of Illustrations 7 and 8 shows that the blend compositions containing 5 weight % of PLA or more suffer a dramatic loss in the % elongation at the break point. Therefore only those PC/PBS thermoplastic compositions containing less than 5 weight % of PLA relative to the total weight of the thermoplastic composition (less than 50 weight % based on 100 parts by weight of the total polyester content of the thermoplastic composition) have both a high % elongation at the break point and a high NII. In conclusion, the results show that it is important to limit the loading of the optional component PLA in the thermoplastic compositions of the invention.

TABLE 3

| Component | Unit | Illust. 5 | Illust. 6 | Illust. 7 | Illust. 8 |
|---|---|---|---|---|---|
| Composition | | | | | |
| PC-1 | Weight % | 15 | 15 | 15 | 15 |
| PC-2 | Weight % | 74.7 | 74.7 | 74.7 | 74.7 |
| PBS-1 | Weight % | 10 | 7.5 | 5 | 2.5 |
| PLA | Weight % | 0 | 2.5 | 5 | 7.5 |
| Properties | | | | | |
| MFR | g/10 min | 5.6 | 7.2 | 8.5 | 11.1 |
| NII | Ductility % | 100 | 100 | 100 | 100 |
| | J/m | 810 | 836 | 922 | 961 |
| HDT@ 3.2 mm | Deg C. | 116 | 116 | 116 | 115 |
| TS@ break | MPa | 53 | 56 | 44 | 44 |
| TS@ yield | MPa | 56 | 56 | 58 | 62 |
| TM | MPa | 2039 | 2085 | 2189 | 2328 |
| Elong. @ break | % | 75 | 77 | 11 | 15 |
| Elong. @ yield | % | 5 | 5 | 5 | 5 |
| FM | MPa | 1860 | 1900 | 1950 | 2080 |
| FS@ yield | MPa | 85 | 89 | 89 | 94 |
| FS@ break | MPa | 83 | 87 | 87 | 92 |

TABLE 4

| Component | Unit | Illustr. 9 | Illustr. 10 | Illustr. 11 | Illustr. 12 | Illustr. 13 | Illustr. 14 | Illustr. 15 | Illustr. 16 |
|---|---|---|---|---|---|---|---|---|---|
| Composition | | | | | | | | | |
| PC-1 | Weight % | 15.12 | 15 | 13.28 | 9.95 | 13.45 | 11.76 | 10.1 | 0 |
| PC-2 | Weight % | 75.58 | 74.7 | 66.41 | 49.75 | 67.25 | 58.94 | 50.6 | 60.7 |
| ABS | Weight % | 9 | 0 | 0 | 0 | 9 | 9 | 9 | 9 |
| PBS-1 | Weight % | 0 | 10 | 20 | 30 | 10 | 20 | 30 | 30 |
| Properties | | | | | | | | | |
| MFR | g/10 min | 4.1 | 6.3 | 10.2 | 17.7 | 8.6 | 14.7 | 23.1 | 22.6 |
| ASTM NII | Ductility % | 100 | 100 | 100 | 100 | 100 | 100 | 100 | 100 |
| | J/m | 798 | 871 | 829 | 780 | 770 | 900 | 718 | 428 |
| | Rsd | 2.58 | 1.88 | 2.66 | 3.53 | 1.96 | 4.39 | 2.93 | 2.95 |
| HDT@ 3.2 mm | deg C. | 121 | 112 | 96.3 | 74.9 | 109 | 94.6 | 85.7 | 64 |
| TS@ break | MPa | 46.4 | 47.6 | 30.6 | 33 | 39.6 | 29.6 | 39 | 28 |
| TS@ yield | MPa | 52 | 50.8 | 45.6 | — | 46 | 40.2 | 39 | — |
| TM | MPa | 2078 | 1972 | 1827 | 1497 | 1840 | 1643 | 1545 | 1291 |
| Elong. @ break | % | 67 | 83 | 29 | 42 | 68 | 88 | 80 | 18 |
| Elong. @ yield | % | 5.7 | 5.5 | 5.6 | — | 5.4 | 5.5 | 6 | — |
| FM | MPa | 1980 | 1930 | 1700 | 1300 | 1720 | 1520 | 1390 | 1190 |
| FS@ yield | MPa | 85.5 | 82.9 | 70.1 | 55.2 | 71.8 | 61.3 | 60 | 46 |
| FS@ break | MPa | 83.9 | 81.3 | 68.8 | 54.1 | 70.5 | 60.1 | 59 | 45 |

Illustrations 10 to 12 in Table 4 demonstrate that thermoplastic compositions comprising a polycarbonate polymer and the polyester polymer may contain various amounts of the polyester polymer, in this case PBS. Such compositions have useful mechanical and physical properties, as can be seen by a comparison of their properties with those of the commercial thermoplastic composition in Illustration 9. In particular, the flow increases as the loading of PBS increases in these Illustrations; however, the thermoplastic composition containing 10 weight % of PBS based on 100 parts by weight of the thermoplastic composition has the best impact properties. The Illustrations in Table 4 further demonstrate the beneficial effects on the property balance that may be achieved when additional components are introduced into these thermoplastic compositions. For example, Illustrations 13 to 16 in Table 4 demonstrate that these thermoplastic compositions may contain additional components such as the impact modifier ABS. A comparison of the properties of Illustrations 14 and 11 indicate that the inclusion of such impact modifiers in these thermoplastic compositions can improve the property balance of the composition by increasing the values of both NII and % elongation at break. As a result, the inclusion of ABS into the thermoplastic composition allows the optimum property balance to be achieved at a higher level of PBS loading (20 weight % versus 10 weight % of PBS based on 100 parts by weight of the thermoplastic composition). Illustration 16 indicates that only one PC may be used in the thermoplastic composition instead of a blend of a higher and lower molecular weight (viscosity) PC, as was done in Illustration 15. However a comparison of the impact, modulus and tensile properties of these two Illustrations indicates that care must be taken in selecting the (viscosity) properties of the PC. Without wishing to be bound to a specific mechanism, the inventors believe that the PC should have a low enough melt viscosity so that there is not a mismatch in the viscosities of the PC and PBS and a resultant deterioration of the properties of the thermoplastic composition.

In conclusion, the Illustrations in Tables 4 and 5 shows that the property balance of the thermoplastic compositions comprising a polycarbonate polymer and the polyester polymer may be modified to meet the requirements of differing applications by varying the level of the polyester polymer, varying the molecular weight of the polycarbonate polymer and/or polyester polymer, or including additional components such as impact modifiers and/or fillers or reinforcing agents. The properties of these thermoplastic compositions in Tables 4 and 5 also compare favorably to those of commercially available thermoplastic compositions (Illustration 9).

TABLE 5

| Component | Unit | Illustr. 17 | Illustr. 18 | Illustr. 19 | Illustr. 20 | Illustr. 21 |
|---|---|---|---|---|---|---|
| Composition | | | | | | |
| PC-1 | Weight % | 11.76 | 11.76 | 11.76 | 10.05 | 8.45 |
| PC-2 | Weight % | 58.94 | 58.94 | 58.94 | 50.64 | 42.25 |
| ABS | Weight % | 9 | 9 | 9 | 9 | 9 |
| PBS-1 | Weight % | 10 | 0 | 0 | 20 | 30 |
| PBS-2 | Weight % | 0 | 10 | 0 | 0 | 0 |
| PBS-3 | Weight % | 0 | 0 | 10 | 0 | 0 |
| Talc-1 | Weight % | 10 | 10 | 10 | 10 | 10 |
| Properties | | | | | | |
| MFR | g/10 min | 6.36 | 5.0 | 6.2 | 12.1 | 23.4 |
| ASTM NII | Ductility % | 100 | 100 | 100 | 100 | 100 |
| | J/m | 965 | 1050 | 801 | 730 | 619 |
| | Rsd | 4.57 | | | 3.41 | 2.63 |
| HDT@ 3.2 mm | deg C. | 109 | 112 | 110 | 83.3 | 61.8 |
| TS@ break | MPa | 45.4 | 55 | 38 | 25 | 28 |
| TS@ yield | MPa | 49.4 | 48 | 50 | 36.4 | — |
| TM | MPa | 2344 | 2512 | 2638 | 1912 | 1606 |
| Elong. @ break | % | 110 | 118 | 63 | 17 | 29 |
| Elong. @ yield | % | 5 | 5 | 4 | 5.3 | — |
| FM | MPa | 2240 | 2327 | 2360 | 1880 | 1470 |
| FS@ yield | MPa | 72.6 | 79.4 | 76.2 | 59.7 | 48.1 |
| FS@ break | MPa | 71.3 | 78 | 75 | 58.6 | 47.2 |

Illustrations 17 to 21 in Table 5 demonstrate that fillers or reinforcing agents such as talc may also be introduced to the thermoplastic compositions in order to modify the property balance. For example, Illustrations 17 and 18 have the highest values of NII and % elongation at break. This synergy at a loading of 10 weight % of PBS and 10 weight % of talc based on 100 parts by weight of the thermoplastic composition (Illustrations 17 and 18) is quite surprising in that the incorporation of mineral fillers typically has a detrimental effect on these properties. The Illustrations 17 to 19 demonstrate that various molecular weight PBS polymers may be used in the thermoplastic compositions. However a comparison of the properties of the thermoplastic composition having the lowest molecular weight PBS (Illustration 19) with the other two containing higher molecular weight PBS (Illustrations 17 and 18) demonstrates that better tensile and impact properties are obtained when higher molecular weight PBS is used in the composition.

TABLE 6

| Component | Unit | Illust. 22 | Illust. 23 | Illust. 24 | Illust. 25 |
|---|---|---|---|---|---|
| Composition | | | | | |
| PC-1 | Weight % | 51.68 | 46.5 | 41.34 | 36.18 |
| PC-2 | Weight % | 22.15 | 19.9 | 17.72 | 15.5 |
| ABS | Weight % | 12.97 | 11.7 | 10.38 | 9.08 |
| SAN | Weight % | 12.97 | 11.7 | 10.38 | 9.08 |
| PBS-1 | Weight % | 0 | 10 | 20 | 30 |
| Properties | | | | | |
| MFR | g/10 min | 14.6 | 30.6 | 53.5 | 79.9 |
| NII | Ductility % | 100 | 100 | 100 | 0 |
| | J/m | 663 | 785 | 330 | 174 |
| HDT@ 3.2 mm | deg C. | 116.0 | 102.0 | 94.3 | 89.2 |
| TS@ break | MPa | 42.8 | 38.8 | 35.8 | 33.2 |
| TM | MPa | 2250 | 1868 | 1823 | 1615 |
| Elong. @ break | % | 30 | 84 | 75 | 71 |

The Illustrations in Table 6 show that ungrafted rigid copolymers such as SAN may also be included in the thermoplastic compositions comprising a polycarbonate polymer and the polyester polymer. It should be noted that in these Illustrations the PBS was fed to the extruder in a single (upstream) feeding. Illustrations 23 to 25 show that the addition of the SAN to the thermoplastic compositions gives very high flow properties relative to the thermoplastic compositions not containing SAN in the earlier Tables 2 to 5. The thermoplastic composition containing 10 weight % of PBS based on 100 parts by weight of the thermoplastic composition in this table (Illustration 23) has an optimum property balance in that it has high values for both NII and % elongation at break. Interesting to note is that increasing the PBS content of these examples leads not only to an improvement in the flow but also to the elongation at break.

TABLE 7

| Component | Unit | Illust. 26 | Illust. 27 | Illust. 28 | Illust. 29 |
|---|---|---|---|---|---|
| Composition | | | | | |
| PC-1 | Weight % | 15.12 | 13.45 | 13.45 | 11.76 |
| PC-2 | Weight % | 75.58 | 67.25 | 67.25 | 58.94 |
| ABS | Weight % | 9 | 9 | 9 | 9 |
| PBS-1 | Weight % | 0 | 10 | 0 | 10 |
| Talc-1 | Weight % | 0 | 0 | 10 | 10 |
| Properties | | | | | |
| MFR | g/10 min | 3.2 | 6.3 | 3.1 | 6.2 |
| NII | Ductility % | 100 | 100 | 100 | 100 |
|  | J/m | 850 | 780 | 966 | 997 |
| HDT@ 3.2 mm | deg C. | 119 | 108 | 126 | 111 |
| TS@ break | MPa | 54 | 48 | 56 | 52 |
| TM | MPa | 2067 | 1779 | 3062 | 2790 |
| Elong. @ break | % | 89 | 90 | 77 | 103 |
| Elong. @ yield | % | 6 | 5 | 4 | 4 |
| FM | MPa | 1893 | 1643 | 2820 | 2400 |
| FS@ break | MPa | 80 | 71 | 91 | 81 |

The Illustrations in Table 7 show a beneficial synergetic effect between PBS and talc. Illustration 27 containing PBS has improved flow but poorer impact and modulus properties versus Illustration 26, which contains no PBS. In contrast, adding talc to the thermoplastic composition instead of PBS (Illustration 28) does not improve flow but improves the impact and modulus properties. When both PBS and talc are added to the thermoplastic composition (Illustration 29), an increase in not only flow but also impact and modulus properties is observed.

TABLE 8

| Component | Unit | Illustr. 30 | Illustr. 31 | Illustr. 32 | Illustr. 33 | Illustr. 34 | Illustr. 35 |
|---|---|---|---|---|---|---|---|
| Composition | | | | | | | |
| PC-1 | Weight % | 11.76 | 10.76 | 10.76 | 14.12 | 12.45 | 10.76 |
| PC-2 | Weight % | 58.94 | 64.94 | 54.94 | 75.58 | 67.25 | 58.94 |
| PC-3 | Weight % | 0 | 0 | 0 | 10 | 10 | 10 |
| ABS | Weight % | 9 | 9 | 9 | 0 | 0 | 0 |
| PBS-1 | Weight % | 10 | 15 | 15 | 0 | 10 | 10 |
| Talc-2 | Weight % | 10 | 0 | 10 | 0 | 0 | 10 |
| Properties | | | | | | | |
| MFR | g/10 min | 5.0 | 11.6 | 9.6 | 3.6 | 5.9 | 6.3 |
| ASTM NII | Ductility % | 100 | 100 | 100 | 100 | 100 | 100 |
|  | J/m | 1050 | 781 | 787 | 981 | 852 | 1020 |
| HDT@ 3.2 mm | deg C. | 112 | 104 | 101 | 124 | 112 | 114 |
| TS@ break | MPa | 55 | 53 | 27 | 57 | 41 | 53 |
| TS@ yield | MPa | 48 | 48 | 49 | 58 | 51 | 48 |
| TM | MPa | 2512 | 1840 | 1840 | 2151 | 1932 | 2672 |
| Elong. @ break | % | 118 | 98 | 68 | 78 | 24 | 98 |
| Elong. @ yield | % | 5 | 5 | 4 | 5 | 5 | 5 |
| FM | MPa | 2327 | 1650 | 2220 | 1950 | 1740 | 2410 |
| FS@ break | MPa | 78 | 69 | 74 | 88 | 77 | 83 |

The Illustrations in Table 8 show that the beneficial synergistic effect of the PBS and talc occurs also in other thermoplastic compositions containing either other types of talc (e.g. Talc-2) or without the ABS (Illustrations 33 to 35). Illustrations 31 and 32 show that this beneficial synergy is lost however when the PBS level is increased to 15 weight % based on 100 parts by weight of the thermoplastic composition.

TABLE 9

| Component | Unit | Illustr. 36 | Illustr. 37 | Illustr. 38 | Illustr. 39 | Illustr. 40 | Illustr. 41 | Illustr. 42 | Illustr. 43 |
|---|---|---|---|---|---|---|---|---|---|
| Composition | | | | | | | | | |
| PC-1 | Weight % | 8.42 | 8.42 | 8.42 | 8.42 | 8.42 | 8.42 | 8.42 | 8.42 |
| PC-2 | Weight % | 42.2 | 42.2 | 42.2 | 42.2 | 42.2 | 42.2 | 42.2 | 42.2 |
| ABS | Weight % | 9 | 9 | 9 | 9 | 9 | 9 | 9 | 9 |
| PBS-1 | Weight % | 30 | 30 | 30 | 30 | 30 | 30 | 30 | 30 |
| AH-1 | Weight % | 0 | 1 | | | | | | |
| AH-2 | Weight % | 0 | | 0.5 | 1 | | | | |
| AH-3 | Weight % | 0 | | | | 0.1 | 0.2 | | |
| AH-4 | Weight % | 0 | | | | | | 2.5 | 5 |
| Properties | | | | | | | | | |
| MFR | g/10 min | 16.9 | 13.6 | 9.49 | 9.43 | 13.5 | 9.15 | 7.73 | 4.35 |
| ASTM NII | Ductility % | 100 | 100 | 100 | 100 | 100 | 100 | 100 | 100 |
| | J/m | 273 | 214 | 287 | 306 | 260 | 251 | 331 | 392 |
| HDT@ 3.2 mm | deg C. | 92.1 | 94.1 | 96.6 | 96.2 | 95.3 | 95.6 | 92.2 | 85.9 |
| TS@ break | Mpa | 35 | 37 | 36 | 35 | 37 | 35 | 32 | 30 |
| TS@ yield | Mpa | 42 | 44 | 43 | 43 | 44 | 43 | 38 | 35 |
| TM | Mpa | 3065 | 3191 | 3073 | 3076 | 3111 | 3078 | 2741 | 2515 |
| Elong. @ break | % | 12 | 9 | 11 | 11 | 9 | 9 | 14 | 17 |
| Elong. @ yield | % | 5 | 4 | 4 | 4 | 4 | 4 | 5 | 5 |
| FM | Mpa | 2580 | 2620 | 2520 | 2470 | 2580 | 2570 | 2400 | 2250 |
| FS@ yield | Mpa | 65 | 69 | 68 | 68 | 69 | 70 | 60 | 55 |
| FS@ break | Mpa | 64 | 68 | 67 | 67 | 68 | 68 | 59 | 54 |

TABLE 10

| Hydrolytic aging test time (hrs) @80° C., 95% RH | Property | Illustr. 36 | Illustr. 37 | Illustr. 38 | Illustr. 39 | Illustr. 40 | Illustr. 41 | Illustr. 42 | Illustr. 43 |
|---|---|---|---|---|---|---|---|---|---|
| 0 | ASTM | 254 | 217 | 287 | 313 | 251 | 258 | 317 | 362 |
| 51.5 | NII (J/m) | 96 | 94 | 270 | 290 | 120 | 125 | 203 | 253 |
| 95.5 | | 45 | 48 | 263 | 296 | 53 | 58 | 93 | 129 |
| 159 | | 16 | 22 | 234 | 263 | 20 | 19 | 27 | 33 |
| 200 | | 15 | 18 | 218 | 273 | 17 | 17 | 20 | 22 |
| 0 | Elong. @ Break (%) | 10 | 10 | 10 | 11 | 9 | 9 | 13 | 17 |
| 51.5 | | 8 | 6 | 8 | 9 | 7 | 6 | 9 | 13 |
| 95.5 | | 3 | 3 | 11 | 8 | 3 | 3 | 3 | 4 |
| 159 | | 1 | 2 | 8 | 8 | 1 | 1 | 2 | 2 |
| 200 | | 1 | 1 | 8 | 7 | 1 | 1 | 1 | 1 |
| 0 | TS@yield (MPa) | 41 | 42 | 42 | 43 | 43 | 42 | 37 | 34 |
| 51.5 | | 44 | 18 | 44 | 45 | 45 | 18 | 40 | 37 |
| 95.5 | | — | — | 44 | 44 | — | — | — | — |
| 159 | | — | — | 43 | 43 | — | — | — | — |
| 200 | | — | — | 47 | 47 | — | — | — | — |

TABLE 11

| Component | Unit | Illustr. 44 | Illustr. 45 | Illustr. 46 | Illustr. 47 | Illustr. 48 | Illustr. 49 | Illustr. 50 | Illustr. 51 |
|---|---|---|---|---|---|---|---|---|---|
| Composition | | | | | | | | | |
| PC-1 | Weight % | 14.2 | 14.2 | 13.3 | 13.3 | 10.8 | 10.8 | 9.95 | 9.95 |
| PC-2 | Weight % | 70.5 | 70.5 | 66.4 | 66.4 | 53.9 | 53.9 | 49.75 | 49.75 |
| PBS-1 | Weight % | 10 | 10 | 10 | 10 | 30 | 30 | 30 | 30 |
| NF-1 | Weight % | 5 | 0 | 10 | 0 | 5 | 0 | 10 | 0 |
| NF-2 | Weight % | 0 | 5 | 0 | 10 | 0 | 5 | 0 | 10 |
| Properties | | | | | | | | | |
| MFR | g/10 min | 5.7 | 5.3 | 5.6 | 6.0 | 15 | 14 | 14.9 | 16 |
| ASTM NII | Ductility % | 100 | 100 | 100 | 100 | 100 | 100 | 100 | 100 |
| | J/m | 276 | 468 | 146 | 296 | 103 | 212 | 105 | 167 |

TABLE 11-continued

| Component | Unit | Illustr. 44 | Illustr. 45 | Illustr. 46 | Illustr. 47 | Illustr. 48 | Illustr. 49 | Illustr. 50 | Illustr. 51 |
|---|---|---|---|---|---|---|---|---|---|
| HDT@ 3.2 mm | deg C. | 114 | 115 | 113 | 114 | 92.6 | 94.1 | 95.4 | 94.7 |
| TS@ break | MPa | 2363 | 2393 | 2769 | 2811 | 2284 | 2267 | 2785 | 2674 |
| TS@ yield | MPa | 38 | 41 | 45 | 40 | 39 | 39 | 44 | 38 |
| TM | MPa | 30 | 30 | 10 | 38 | 49 | 48 | 52 | 46 |
| Elong. @ break | % | 9 | 7 | 6 | 7 | 12 | 19 | 8 | 11 |
| Elong. @ yield | % | 3 | 3 | 1 | 4 | 5 | 6 | 5 | 6 |
| FM | MPa | 2130 | 2160 | 2460 | 2550 | 1920 | 1950 | 2390 | 2220 |
| FS@ yield | MPa | 85 | 84 | 85 | 81 | 76 | 74 | 82 | 74 |
| FS@ break | MPa | 83 | 83 | 84 | 79 | 74 | 73 | 81 | 73 |

TABLE 12

| Component | Unit | Illustr. 52 | Illustr. 53 | Illustr. 54 | Illustr. 55 | Illustr. 56 | Illustr. 57 | Illustr. 58 | Illustr. 59 | Illustr. 60 |
|---|---|---|---|---|---|---|---|---|---|---|
| Composition | | | | | | | | | | |
| PC-1 | Weight % | 15.12 | 11.8 | 10.1 | 11.8 | 10.1 | 10.1 | 10.1 | 8.45 | 10.1 |
| PC-2 | Weight % | 75.58 | 58.9 | 50.6 | 58.9 | 50.6 | 50.6 | 50.6 | 42.25 | 50.6 |
| ABS | Weight % | 9 | 9 | 9 | 9 | 9 | 9 | 9 | 9 | 0 |
| MBS | Weight % | 0 | 0 | 0 | 0 | 0 | 0 | 0 | 0 | 9 |
| MAH-g-ABS | Weight % | 0 | 0 | 0 | 1 | 1 | 1 | 2 | 2 | 1 |
| PBS-1 | Weight % | 0 | 20 | 30 | 14.5 | 24.5 | 24.5 | 19 | 29 | 24.5 |
| NF-2 | Weight % | 0 | 0 | 0 | 4.5 | 4.5 | 4.5 | 9 | 9 | 4.5 |
| Properties | | | | | | | | | | |
| MFR | g/10 min | 3.37 | 15.1 | 23.1 | 10.2 | 22.8 | 16.9 | 13.1 | 23.4 | 12.4 |
| ASTM NII | Ductility % | 100 | 100 | 100 | 100 | 100 | 100 | 100 | 100 | 100 |
| | J/m | 690 | 674 | 718 | 376 | 250 | 281 | 196 | 123 | 275 |
| | Rsd | 8.88 | 7.82 | 2.93 | 1.7 | 11 | 4.45 | 3.88 | 5.79 | 5.07 |
| HDT@ 3.2 mm | deg C. | 121 | 88.3 | 85.7 | 104 | 91.4 | 90.7 | 95.3 | 84.8 | 90.5 |
| TS@ break | MPa | 43 | 38 | 39 | 34 | 33 | 33 | 32 | 30 | 33 |
| TS@ yield | MPa | 52 | 42 | 39 | 43 | 41 | 40 | 41 | — | 40 |
| TM | MPa | 2101 | 1695 | 1545 | 2144 | 2033 | 1940 | 2420 | 2052 | 1934 |
| Elong. @ break | % | 50 | 76 | 80 | 19 | 17 | 20 | 14 | 15 | 18 |
| Elong. @ yield | % | 6 | 6 | 6 | 5 | 5 | 5 | 5 | — | 5 |
| FM | MPa | 2040 | 1540 | 1390 | 2030 | 1890 | 1770 | 2280 | 1890 | 1800 |
| FS@ yield | MPa | 86.6 | 63.5 | 60.2 | 71.0 | 67.1 | 64.6 | 68.7 | 60.7 | 66 |
| FS@ break | MPa | 85.1 | 62.3 | 59.1 | 69.7 | 65.8 | 63.4 | 67.4 | 59.5 | 65 |

The Illustrations in Tables 9 and 10 show that anti-hydrolysis agents may also be included in the thermoplastic compositions. A comparison of the aging data in Table 9 indicates though that the compositions (Illustrations 38 and 39) containing the anti-hydrolysis agent AH-2 give superior performance in terms of retention of the impact and tensile properties of these compositions versus their counterparts containing AH-1, AH-3, or AH-4.

The Illustrations in Table 11 show that the thermoplastic compositions may also contain natural fibers as a filler or reinforcing agent. Including natural fibers in these compositions increases their content of biosourced materials and also increases their tensile properties relative to thermoplastic compositions not containing fibrous fillers or reinforcing agents. These natural fibers may be coated or not coated. A comparison of the properties of the Illustrations containing coated natural fibers (Illustrations 45, 47, 49 and 51) with the corresponding Illustrations containing uncoated natural fibers (Illustrations 44, 46, 48 and 50) shows that the thermoplastic compositions containing the coated natural fibers have much better NII values, whereas the modulus, strength, and impact properties remain comparable or in some cases even improved.

The Illustrations in Table 12 show an additional aspect in balancing the properties of thermoplastic compositions comprising a polycarbonate polymer and the polyester polymer. Comparing Illustrations 53 and 54 versus the commercial thermoplastic composition (Illustration 52) demonstrates that increasing the content of the polyester (PBS) increases the flow properties (MFR) without sacrificing the impact properties (NII); however, the modulus properties (TM) decrease in these Illustrations. Illustrations 55 to 59 show that the modulus properties can be recovered by also including the coated natural fiber and MAH-g-ABS in the thermoplastic compositions. Alternatively, Illustration 60 demonstrates that MBS may be substituted for ABS in these thermoplastic compositions and similar properties will be obtained (for example, comparing Illustrations 60 and 56). The properties of these same thermoplastic compositions also compare favorably to those of a reference thermoplastic composition (Illustration 52).

TABLE 13

| Component | Unit | Illustr. 61 | Illustr. 62 | Illustr. 63 | Illustr. 64 | Illustr. 65 |
|---|---|---|---|---|---|---|
| Composition | | | | | | |
| PC-1 | Weight % | 10.1 | 10.1 | 8.45 | 8.45 | 0 |
| PC-2 | Weight % | 50.6 | 50.6 | 42.75 | 42.25 | 44.7 |
| PC-3 | Weight % | 0 | 0 | 0 | 0 | 15 |
| ABS | Weight % | 9 | 9 | 9 | 9 | 0 |
| MAH-g-ABS | Weight % | 1 | 2 | 1 | 0 | 0 |
| PBS-1 | Weight % | 24.5 | 19 | 29 | 30 | 30 |
| NF-2 | Weight % | 4.5 | 9 | 4.5 | 0 | 0 |
| GF | Weight % | 0 | 0 | 5 | 10 | 10 |
| Properties | | | | | | |
| MFR | g/10 min | 13.8 | 14.1 | 19.5 | 14.7 | 12 |
| NII | Ductility % | 100 | 100 | 100 | 100 | 100 |
|  | J/m | 248 | 151 | 163 | 213 | 546 |
| HDT@ 3.2 mm | deg C. | 89.8 | 93.9 | 91.5 | 92 | 86 |
| TS@ break | Mpa | 32.4 | 33.2 | 31.2 | 31 | 39 |
| TS@ yield | MPa | 40 | 41 | — | 42 | 45 |
| TM | MPa | 1926 | 2420 | 2546 | 3065 | 2100 |
| Elong. @ break | % | 18 | 13 | 14 | 12 | 54 |
| Elong. @ yield | % | 5.5 | 4.7 | — | 5 | 5 |
| FM | MPa | 1770 | 2200 | 2150 | 2360 | 2000 |
| FS@ yield | Mpa | 65.1 | 68.7 | 63.9 | 64 | 69 |
| FS@ break | MPa | 63.8 | 67.5 | 62.7 | 62 | 66 |

TABLE 14

| Component | Unit | Illustr. 66 | Illustr. 67 | Illustr. 68 | Illustr. 69 | Illustr. 70 | Illustr. 71 |
|---|---|---|---|---|---|---|---|
| Composition | | | | | | | |
| PC-1 | Weight % | 11.28 | 11.28 | 11.28 | 11.26 | 11.2 | 11.28 |
| PC-2 | Weight % | 56.42 | 51.41 | 46.41 | 40.43 | 51 | 56.41 |
| PC-3 | Weight % | 0 | 5 | 10 | 16 | 10 | 10 |
| PBS-1 | Weight % | 10 | 10 | 10 | 10 | 10 | 10 |
| Talc-1 | Weight % | 10 | 10 | 10 | 10 | 10 | 0 |
| FR-1 | Weight % | 0.5 | 0.5 | 0.5 | 0.5 | 0.5 | 0.5 |
| FR-2 | Weight % | 11.5 | 11.5 | 11.5 | 11.5 | 7 | 11.5 |
| Properties | | | | | | | |
| MFR | g/10 min | 26 | 31.8 | 27.5 | 26 | 14.3 | 23.1 |
| NII | Ductility % | 0 | 100 | 100 | 100 | 100 | 100 |
|  | J/m | 120 | 204 | 542 | 641 | 759 | 862 |
| HDT@ 3.2 mm | deg C. | 78.1 | 76.4 | 77.5 | 77.8 | 86.7 | 78.8 |
| TS@ break | MPa | 40 | 35 | 30 | 30 | 40 | 46 |
| TS@ yield | MPa | 60 | 58 | 56 | 43 | 56 | 56 |
| TM | MPa | 3187 | 3124 | 3019 | 2942 | 2914 | 2279 |
| Elong. @ break | % | 37 | 43 | 47 | 41 | 78 | 67 |
| Elong. @ yield | % | 4 | 4 | 4 | 3 | 4 | 4 |
| FM | MPa | 2950 | 2890 | 2800 | 2720 | 2740 | 2130 |
| FS@ yield | MPa | 90 | 87 | 86 | 83 | 86 | 84 |
| FS@ break | MPa | 88 | 86 | 84 | 81 | 84 | 82 |
| UL-Vx | | V0 at 1.5 mm | | | | | |
| UL-Vx FOT | s | 1.45 | 1.71 | 1.88 | 2.41 | 3.01 | 3.84 |
| Flaming Drips | # | 0 | 0 | 0 | 0 | 0 | 0 |

The Illustrations in Table 13 show that part or all of the natural fiber in the thermoplastic compositions may be replaced by glass fiber. For example, both Illustrations 61 and 62 have about the same total weight % content of biosourced materials (PBS and natural fiber); however, increasing the content of natural fiber in Illustration 62 increases the modulus but decreases the impact properties. When some or all of the natural fiber is replaced by glass fiber however (Illustrations 63 and 64), the modulus and impact properties are improved. Replacing some of the natural fiber by glass fiber in Illustration 63 allows the total weight % of biosourced materials to be increased by about 5% while maintaining or even improving the physical properties of the thermoplastic composition relative to those of Illustration 62. Replacing the ABS and some of the BPA polycarbonate by the siloxane PC copolymer in Illustration 65 greatly improves the impact properties while slightly reducing the modulus and HDT properties relative to those of Illustration 64.

The Illustrations in Table 14 demonstrate that flame retardants may be included in the thermoplastic composition in order to meet particular requirements or to pass certain tests regarding flammability. The thermoplastic compositions containing about 10% PBS and the two flame retardants, FR-1 and FR-2, not only have desirable flame retardance properties, but also have a balance of good physical properties, for example, high flow, high modulus and HDT. In particular, it should be noted that Illustration 70 has a combination of both high impact and modulus properties.

It should be noted that the Illustrations of the thermoplastic compositions of the invention in Tables 2 to 14 were determined to be mixtures of at least two polymers, namely the polycarbonate polymer and the polyester polymer. Without wishing to be bound to a particular mechanism, the inventors believe that the relatively short melt mixing times typical of extrusion processing are simply too short for appreciable reaction of the components of the thermoplastic composition, especially in the absence of large amounts of an added catalyst. All of these same Illustrations were opaque. These Illustrations could also be dissolved in a solvent and then the polycarbonate and polyester polymers could be separated from each other, for example by size exclusion chromatography. At least two distinct glass transition temperatures could also be observed for these Illustrations, one for the polycarbonate polymer and one for the polyester polymer. The impact strength properties of the Illustrations are also higher than could be obtained by a reaction product of a polycarbonate polymer and a polyester polymer.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. A thermoplastic composition comprising:
    a mixture of
    i) from 10 to 98 weight % of a polycarbonate polymer, wherein the polycarbonate polymer is an aromatic polymer or an alicyclic polymer;
    ii) from 2 to 90 weight % of a polyester polymer comprising structures derived from a diol compound having the structure (A) HO—Z—OH, wherein Z is a $C_4$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH, and
    iii) a polylactic acid polymer, wherein the polylactic acid polymer is present in an amount of up to 5 wt %;
    wherein the sum of the polycarbonate polymer, the polyester polymer, and the polylactic acid polymer is equal to 100 weight %.

2. The thermoplastic composition of claim 1, wherein Z is a $C_4$ to $C_6$ linear aliphatic radical, a $C_3$ to $C_6$ branched or cyclo-aliphatic radical, or a combination thereof.

3. The thermoplastic composition of claim 1, wherein the polyester polymer is polybutylene succinate.

4. The thermoplastic composition of claim 1, wherein the mixture contains from 5 to 40 weight % of the polyester polymer.

5. A thermoplastic composition comprising:
    a mixture of
    i) from 10 to 98 weight % of a polycarbonate polymer, wherein the polycarbonate polymer is an aromatic polymer or an alicyclic polymer;
    ii) from 2 to 90 weight % of a polyester polymer comprising structures derived from a diol compound having the structure (A) HO—Z—OH, wherein Z is a $C_4$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH,
    iii) a polylactic acid polymer, wherein the polylactic acid polymer is present in an amount of up to 5 wt %; and
    iv) from 0 to 30 weight % of a filler,
    wherein the sum of the polycarbonate polymer, the polyester polymer, the polylactic acid polymer, and the filler is equal to 100 weight %.

6. The thermoplastic composition of claim 5, wherein Z is a $C_4$ to $C_6$ linear aliphatic radical, a $C_3$ to $C_6$ branched or cyclo-aliphatic radical, or a combination thereof.

7. The thermoplastic composition of claim 5, wherein the polyester polymer is polybutylene succinate.

8. The thermoplastic composition of claim 5, wherein the mixture contains from 5 to 15 weight % of the polyester polymer and from 5 to 15 weight % of the filler.

9. The thermoplastic composition of claim 5, wherein the filler is talc, glass fiber, natural fiber or a combination of two or more of the foregoing fillers.

10. The thermoplastic composition of claim 5, wherein the thermoplastic composition further comprises an additive,
    wherein the additive is a quencher, a flow promoter, an antioxidant, a heat stabilizer, an anti-hydrolysis stabilizer, a light stabilizer, an UV absorber, a plasticizer, a lubricant, a mold release agent, an anti-static agent, a pigment, a dye, a flame retardant, an anti-drip agent, a blowing agent, or a combination of two or more of the foregoing additives.

11. A thermoplastic composition comprising:
    a mixture of
    i) from 10 to 98 weight % of a polycarbonate polymer, wherein the polycarbonate polymer is an aromatic polymer or an alicyclic polymer;
    ii) from 2 to 90 weight % of a polyester polymer comprising structures derived from a diol compound having the structure (A) HO—Z—OH, wherein Z is a $C_4$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH,
    iii) a polylactic acid polymer, wherein the polylactic acid polymer is present in an amount of up to 5 wt %;
    iv) from 0 to 30 weight % of a filler, and
    v) from 0 to 30 weight % of an impact modifier,
    wherein the sum of the polycarbonate polymer, the polyester polymer, the polylactic acid polymer, the filler, and the impact modifier is equal to 100 weight %.

12. The thermoplastic composition of claim 11, wherein Z is a $C_4$ to $C_6$ linear aliphatic radical, a $C_3$ to $C_6$ branched or cyclo-aliphatic radical, or a combination thereof.

13. The thermoplastic composition of claim 11, wherein the polyester polymer is polybutylene succinate.

14. The thermoplastic composition of claim 11, wherein the filler is talc, glass fiber, natural fiber or a combination of two or more of the foregoing fillers.

15. The thermoplastic composition of claim 11, wherein the mixture contains from 5 to 15 weight % of the polyester polymer and from 5 to 15 weight % of the filler.

16. The thermoplastic composition of claim 11, wherein the impact modifier is ABS, MBS, ASA, polycarbonate-polysiloxane copolymer, or a combination of two or more of the foregoing impact modifiers.

17. A thermoplastic composition consisting essentially of a mixture of
   i) from 10 to 98 weight % of a polycarbonate polymer, wherein the polycarbonate polymer is an aromatic polymer or an alicyclic polymer;
   ii) from 2 to 90 weight % of a polyester polymer comprising structures derived from a diol compound having the structure (A) HO—Z—OH, wherein Z is a $C_4$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH,
   iii) from 0 to 30 weight % of a filler,
   iv) from 0 to 30 weight % of an impact modifier,
   v) from 0 to 20 weight % of an additive, and
   vi) a polylactic acid polymer; wherein the polylactic acid polymer is present in an amount of up to 5 wt %;
   wherein the additive is a quencher, a flow promoter, an antioxidant, a heat stabilizer, an anti-hydrolysis stabilizer, a light stabilizer, an UV absorber, a plasticizer, a lubricant, a mold release agent, an anti-static agent, a pigment, a dye, a flame retardant, an anti-drip agent, a blowing agent, or a combination of two or more of the foregoing additives,
   and wherein the sum of the polycarbonate polymer, the polyester polymer, the filler, the impact modifier, and the additive is equal to 100 weight %.

18. The thermoplastic composition of claim 17, wherein the mixture contains from 5 to 15 weight % of the polyester polymer.

19. A thermoplastic composition comprising:
   a mixture of
   i) from 10 to 98 weight % of a polycarbonate polymer;
   ii) from 2 to 90 weight % of a polyester polymer comprising structures derived from a diol compound having the structure (A) HO—Z—OH, wherein Z is a $C_1$ to $C_{36}$ linear aliphatic radical, a $C_3$ to $C_{36}$ branched aliphatic or cycloaliphatic radical, a $C_6$ to $C_{36}$ aryl radical, or a $C_7$ to $C_{36}$ alkylaryl radical, and a diacid compound having the structure (B) HOOC—$CH_2CH_2$—COOH, and
   iii) from 0.5 to 5 weight % of a polylactic acid polymer, wherein the sum of the polycarbonate polymer, the polyester polymer, and the polylactic acid polymer is equal to 100 weight %.

* * * * *